(12) United States Patent
Paek et al.

(10) Patent No.: US 9,547,375 B2
(45) Date of Patent: Jan. 17, 2017

(54) SPLIT VIRTUAL KEYBOARD ON A MOBILE COMPUTING DEVICE

(71) Applicant: Microsoft Corporation, Redmond, WA (US)

(72) Inventors: Timothy S. Paek, Sammammish, WA (US); Bongshin Lee, Issaquah, WA (US); Asela Gunawardana, Seattle, WA (US); Johnson Apacible, Mercer Island, WA (US); Anoop Gupta, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 13/920,034

(22) Filed: Jun. 17, 2013

(65) Prior Publication Data

US 2014/0098024 A1 Apr. 10, 2014

Related U.S. Application Data

(63) Continuation-in-part of application No. 13/787,832, filed on Mar. 7, 2013, which is a continuation-in-part of application No. 13/745,860, filed on Jan. 20, 2013.

(60) Provisional application No. 61/712,155, filed on Oct. 10, 2012.

(51) Int. Cl.
*G06F 3/048* (2013.01)
*G06F 3/023* (2006.01)
*G06F 3/0488* (2013.01)

(52) U.S. Cl.
CPC ........... *G06F 3/023* (2013.01); *G06F 3/04886* (2013.01)

(58) Field of Classification Search
CPC .............................. G06F 3/023; G06F 3/04886
USPC .......................................................... 715/702
See application file for complete search history.

(56) References Cited

U.S. PATENT DOCUMENTS

| 6,654,733 B1 | 11/2003 | Goodman et al. |
| 6,882,337 B2 | 4/2005 | Shetter |
| 7,900,156 B2 | 3/2011 | Andre et al. |

(Continued)

FOREIGN PATENT DOCUMENTS

| CN | 102362254 A | 2/2012 |
| CN | 102375691 A | 3/2012 |

(Continued)

OTHER PUBLICATIONS

"International Search Report & Written Opinion for PCT Application No. PCT/US2013/063956", Mailed Date: Apr. 11, 2014, Filed Date: Oct. 9, 2013, 15 Pages.

(Continued)

*Primary Examiner* — David Phantana Angkool
(74) *Attorney, Agent, or Firm* — Steve Wight; Sandy Swain; Micky Minhas

(57) ABSTRACT

Described herein is a split virtual keyboard that is displayed on a tablet (slate) computing device. The split virtual keyboard includes a first portion and a second portion, the first portion being separated from the second portion. The first portion includes a plurality of character keys that are representative at least one respective character. The tablet computing device is configured to support text generation by way of a continuous sequence of strokes over the plurality of character keys in the first portion of the split virtual keyboard.

20 Claims, 16 Drawing Sheets

(56) References Cited

U.S. PATENT DOCUMENTS

| | | | |
|---|---|---|---|
| 8,074,172 B2* | 12/2011 | Kocienda | G06F 3/0237 715/255 |
| 8,335,993 B1* | 12/2012 | Tan | G06F 3/04886 715/773 |
| 8,484,573 B1* | 7/2013 | Zhai | G06F 3/0237 345/168 |
| 8,504,934 B1* | 8/2013 | Yu | G06F 1/1626 200/5 A |
| 8,552,992 B1* | 10/2013 | Kim | G06F 3/0234 345/173 |
| 8,751,970 B2* | 6/2014 | Hinckley | G06F 3/0416 345/173 |
| 8,799,827 B2* | 8/2014 | Hinckley | G06F 3/0483 715/863 |
| 9,075,522 B2* | 7/2015 | Hinckley | G06F 3/04883 |
| 9,104,246 B2* | 8/2015 | Tu | G06F 3/04886 |
| RE45,694 E * | 9/2015 | Shin | |
| 9,317,201 B2* | 4/2016 | Zhai | G06F 3/04886 |
| 2004/0104896 A1 | 6/2004 | Suraqui | |
| 2004/0140956 A1* | 7/2004 | Kushler | G06F 3/04883 345/168 |
| 2008/0291171 A1* | 11/2008 | Shin | G06F 3/0481 345/168 |
| 2010/0238125 A1 | 9/2010 | Ronkainen | |
| 2010/0241985 A1* | 9/2010 | Kim | G06F 3/04886 715/773 |
| 2010/0241993 A1* | 9/2010 | Chae | G01C 21/3611 715/830 |
| 2010/0277414 A1 | 11/2010 | Tartz et al. | |
| 2010/0315266 A1 | 12/2010 | Gunawardana et al. | |
| 2011/0173573 A1* | 7/2011 | Kim | G06F 3/0236 715/856 |
| 2012/0075194 A1 | 3/2012 | Ferren | |
| 2012/0113008 A1* | 5/2012 | Makinen | G06F 3/016 345/168 |
| 2012/0117506 A1* | 5/2012 | Koch | G06F 3/04886 715/773 |
| 2012/0162078 A1 | 6/2012 | Ferren et al. | |
| 2012/0188174 A1* | 7/2012 | Migos | G06F 3/04883 345/173 |
| 2013/0057475 A1 | 3/2013 | Duggan et al. | |
| 2014/0098024 A1* | 4/2014 | Paek | G06F 3/04886 345/168 |
| 2015/0253870 A1* | 9/2015 | Ikeda | G06F 3/0233 345/158 |

FOREIGN PATENT DOCUMENTS

| | | |
|---|---|---|
| CN | 102414642 A | 4/2012 |
| EP | 1555601 A2 | 7/2005 |
| EP | 2079010 A2 | 7/2009 |
| TW | 200928943 A | 7/2009 |
| WO | 2012155776 A1 | 11/2012 |

OTHER PUBLICATIONS

"International Search Report & Written Opinion for PCT Application No. PCT/US2013/063984", Mailed Date: Jan. 29, 2014, Filed Date: Oct. 9, 2013, 9 Pages.

Bell, Killian, "Windows Phone 8's Curved One-Thumb Keyboard Gets Leaked", Retrieved at <<http://www.technobuffalo.com/2012/07/02/windows-phone-8s-curved-one-thumb-keyboard-gets-leaked/>>, Jul. 2, 2012, pp. 1-4.

Aguilera, Ray, "Quick Tip: 5 Essential iPad Keyboard Tricks", Retrieved at <<http://tabtimes.com/how/ittech-os-ipad-ios/2012/07/13/quick-tip-5-essential-ipad-keyboard-tricks>>, Jul. 13, 2012, pp. 1-6.

Aer, "Snapkeys 2i—The World's Fastest Touchscreen Input System", Retrieved at <<http://www.aeriphone.com/snapkeys-2i-the-worlds-fastest-touchscreen-input-system>>, May 14, 2012, pp. 1-2.

Spradlin, Liam, "Thumb Keyboard Gets Updated to Version 4.5 Bringing Continuous Voice Recognition, One-Handed Keyboard, and More", Retrieved at <<http://www.androidpolice.com/2012/07/29/thumb-keyboard-gets-updated-to-version-4-5-bringing-continuous-voice-recognition-one-handed-keyboard-and-more/>>, Jul. 29, 2012, pp. 1-5.

"Windows8 Touch Virtual Keyboard was Born in Mind Speed", Retrieved at <<http://insidechina.onehotspots.com/windows8-touch-virtual-keyboard-was-born-in-mind-speed/56682/>>, Jun. 5, 2012, pp. 1-5.

Afazel, "BlindType for Android Will Solve all Typing Problems for Humanity (maybe)", Retrieved at <<http://www.androidcentral.com/blindtype-android-will-solve-all-typing-problems-humanity>>, Jul. 26, 2010, pp. 1-23.

"Office Action for Chinese Patent Application No. 201380053252.4", Mailed Date: Oct. 20, 2016, 14 Pages.

* cited by examiner

SPLIT VIRTUAL KEYBOARD ON A MOBILE COMPUTING DEVICE

RELATED APPLICATIONS

This application claims the benefit of U.S. Provisional Patent Application No. 61/712,155, filed on Oct. 10, 2012, and entitled "ARCED OR SLANTED SOFT INPUT PANELS." This application is also a continuation-in-part of U.S. patent application Ser. No. 13/787,832, filed on Mar. 7, 2013, and entitled "PROVISION OF HAPTIC FEEDBACK FOR LOCALIZATION AND DATA INPUT," which is a continuation-in-part of U.S. patent application Ser. No. 13/745,860, filed on Jan. 20, 2013, and entitled "TEXT ENTRY USING SHAPEWRITING ON A TOUCH-SENSITIVE INPUT PANEL." The entireties of these applications are incorporated herein by reference.

BACKGROUND

Mobile computing devices have been configured to display soft keyboards, where a user can enter text by selecting buttons on a soft keyboard. Typically, each key on a soft keyboard represents a single character. Accordingly, for a user to input text, the user can select (e.g., through tapping) discrete keys that are representative of respective characters that are desirably included in such text. As many mobile computing devices have relatively small screens, such computing devices have been configured with software that performs spelling corrections and/or corrects for "fat finger syndrome," where a user mistakenly taps a key that is adjacent to a desirably tapped key.

Conventionally, it is very difficult for a user to accurately enter text utilizing a soft keyboard when the user is not able to continuously look at the screen of the mobile computing device that displays the soft keyboard. This can be at least partially attributed to the relatively small size of the screen, and therefore, the relatively small size of keys included in the soft keyboard displayed on the screen. For instance, on an exemplary soft keyboard displayed on a mobile telephone, ten separate keys may exist in a single row of keys. Accordingly, it may be difficult for the user to remember which keys are in which rows, and further may be difficult for the user to tap a particular key in the keyboard without looking at the keyboard.

SUMMARY

The following is a brief summary of subject matter that is described in greater detail herein. This summary is not intended to be limiting as to the scope of the claims.

Described herein are various technologies pertaining to a split virtual keyboard that can be employed in connection with a touch-sensitive display screen, such as a display screen on a tablet (slate) computing device or other suitable device with a diagonal screen length of between about four inches and about fifteen inches. The split virtual keyboard comprises a first portion and a second portion, wherein the first portion is split from the second portion. The first portion of the split virtual keyboard can be positioned on the touch-sensitive display screen to facilitate receipt of input from a thumb of a first hand of a user gripping the tablet computing device, while the second portion of the split virtual keyboard can be positioned on the touch-sensitive display screen to facilitate receipt of input from a thumb of a second hand of the user gripping the tablet computing device.

In an exemplary embodiment, the split virtual keyboard can be used in connection with decoding a continuous sequence of strokes set forth by a user, wherein user-selection of characters (represented by keys of the split virtual keyboard) can be accomplished via the continuous sequence of strokes. A stroke is a transition from a first key in a portion of the split virtual keyboard to a second key in the portion of the split virtual keyboard, and wherein both the first key and the second key are representative of a respective plurality of characters. With more specificity, the aforementioned first portion of the split virtual keyboard can include a plurality of character keys, wherein each character key is representative of a respective plurality of characters. Rather than discreetly tapping keys, a user can employ a thumb of her first hand that is gripping the tablet computing device to set forth a sequence of strokes over a subset of the character keys in the first portion. Thus, in an example, if the user desires to input the word "hat" using the first portion of the split virtual keyboard, the user can cause the thumb of her first hand to transition from a first character key that represents the letter "h" to a second character key that represents the letter "a," and from the second character key to a third character key that represents the "t," while the thumb of the first hand of the user maintains contact with the touch-sensitive display.

Further, the first portion of the split virtual keyboard can be positioned on the touch-sensitive display screen to facilitate receipt of input from a dominant hand of the user. Accordingly, if the user is right-handed, the first portion of the split virtual keyboard can be positioned on a right-hand side of the touch-sensitive display screen of the tablet computing device. If, however, the user is left-handed, the first portion of the split virtual keyboard can be positioned on the left-hand side of the touch-sensitive display screen of the tablet computing device. Accordingly, the user can employ her dominant hand to generate text by way of a continuous trace over character keys of the first portion of the split virtual keyboard.

The second portion of the split virtual keyboard can include at least one key that can be used in connection with setting forth input to an application. For example, at least one key in the second portion of the virtual keyboard can cause, when selected, character keys in the first portion of the split virtual keyboard to change from lowercase to uppercase or uppercase to lowercase. In another example, at least one key in the second portion of the split virtual keyboard can represent an "Enter" key, a "Backspace" key, etc. In still yet another example, one or more keys in the second portion of the split virtual keyboard can represent at least one punctuation mark. Thus, the user may employ the thumb of her dominant hand to set forth words by way of a continuous trace while using the thumb of her non-dominant hand to cause a word to be output to an application, to add punctuation in correspondence with a word, etc. In other embodiments, however, both the first portion and the second portion of the split virtual keyboard can include keys that are representative of respective characters, and text can be generated via continuous traces performed by a thumb of both the first hand of the user and the second hand of the user, respectively (analogously as to how one types using both a left-hand and a right-hand).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
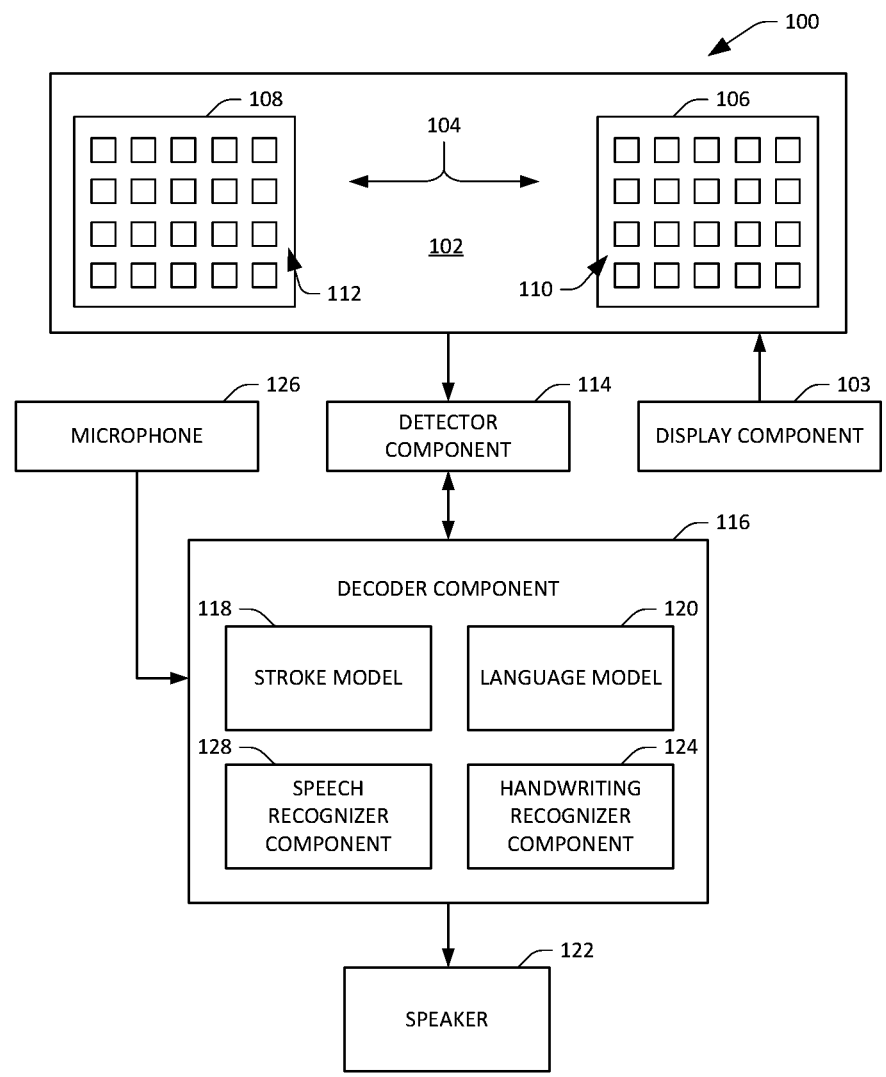
FIG. 1 is a functional block diagram of an exemplary system that facilitates generation of text by way of a split virtual keyboard displayed on a touch-sensitive display of a tablet computing device.

Various technologies pertaining to generation of text by way of a continuous trace over at least one portion of a split virtual keyboard are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various aspects pertaining to generation of text by way of a continuous trace (e.g., a continuous sequence of strokes) over a split virtual keyboard. A stroke, as the term is used herein, is the transition of a digit (e.g., a thumb) from a first key to a second key of a portion of a virtual keyboard while the digit maintains contact with the touch-sensitive display. A continuous sequence of strokes, then, is a sequence of strokes, where the digit maintains contact with the touch-sensitive display throughout the sequence of strokes. In other words, rather than individually tapping, a user can employ her digit to connect keys that are representative of respective letters in a desired word.

With reference now to FIG. 1, a functional block diagram of an exemplary system 100 that facilitates generation of text through utilization of a split virtual keyboard is illustrated. The system 100 may be comprised by a mobile computing device, such as a tablet (slate) computing device. In another exemplary embodiment, the system 100 may be comprised by a mobile telephone with a relatively large display screen (sometimes referred to as a phablet). It is thus to be understood that the system 100 may be comprised by any suitable computing device with a screen diagonal of length between approximately four inches and approximately fifteen inches (such that a user can grip the computing device with two hands and interact with a first portion and a second portion of a split virtual keyboard, one with each hand).

The system 100 comprises a touch-sensitive display 102. A display component 103 causes a split virtual keyboard 104 to be displayed on the touch-sensitive display 102, wherein the split virtual keyboard 104 includes a first portion 106 and a second portion 108, which are split from one another. In an example, the first portion 106 may be separated from the second portion 108 by at least one inch on the touch-sensitive display 102. As will be shown in greater detail herein, the first portion 106 can be positioned on the touch-sensitive display 102 to facilitate receipt of input from a thumb of a first-hand of a user when the user is gripping/holding a mobile computing device that comprises the touch-sensitive display 102. Similarly, the second portion 108 of the split virtual keyboard 104 can be positioned on the touch-sensitive display 102 to facilitate receipt of input from a thumb of a second hand of the user when the user is gripping/holding the mobile computing device. While the first portion 106 of the split virtual keyboard 104 is shown as being positioned on a right-hand side of the touch-sensitive display 102 and the second portion 108 of the split virtual keyboard 104 is shown as being positioned on a left-hand side of the touch-sensitive display 102, it is to be understood that the positions of the first portion 106 and the second portion 108 can be reversed. For example, the first portion 106 of the split virtual keyboard 104 can be positioned on the touch-sensitive display 102 to facilitate receipt of input from a dominant hand of the user (whichever hand that is), while the second portion 108 of the split virtual keyboard 104 can be positioned on the touch-sensitive display 102 to facilitate receipt of input from a thumb of a non-dominant hand of the user.

As indicated above, the virtual keyboard 104 is "split" in that the two portions 106 and 108 are visually distinct from one another, in that the first portion 106 is recognizable by the user as being configured to receive input from the first hand of the user and the second portion 108 is recognizable by the user as being configured to receive input from the second hand of the user. Accordingly, the first portion 106 and the second portion 108 can be separate by a visual boundary or space that graphically distinguishes the first portion 106 from the second portion 108. Further, it is to be understood that the first portion 106 and the second portion 108 can be displayed on separate portions of a display; for example, the touch-sensitive display 102 may comprise two displays: a first display and a second "pullable" display that effectively extends the display. In such an example, the first portion 106 can be displayed on the first display and the second portion can be displayed on the second "pullable" display. Similarly, the display 102 can comprise two displays that can be folded, similar to a book. The first portion 106 can be displayed on a first display, and the second portion 108 can be displayed on a second display.

The first portion 106 of the split virtual keyboard 104 comprises a first plurality of keys 110. In an example, the first plurality of keys 110 may comprise character keys, wherein each character key is representative of at least one respective character (e.g., letter). In another embodiment, at least one character key in the character keys can be representative of multiple letters. In still yet another exemplary embodiment, each character key in the character keys can be representative of a respective plurality of characters. For instance, the first plurality of keys 110 can comprise eight or nine character keys, wherein each character key is representative of a respective plurality of characters, and wherein the character keys are representative of an entirety of an alphabet (e.g., the English alphabet). The first plurality of keys 110 may also comprise numerical keys, a key representative of an "Enter" key, a key representative of a "Spacebar" key, a "mode" key that causes a mode of at least the first portion 106 of the split virtual keyboard to alter when selected (e.g., characters can change from lowercase to uppercase and vice versa), and the like.

The second portion 108 of the split virtual keyboard 104 can comprise a second plurality of keys 112. The second plurality of keys 112 may include keys that are particularly well-suited in connection with decoding words set forth by the user through employment of the first plurality of keys 110. For example, the second plurality of keys 112 may include an "Enter" key, a "Spacebar" key, etc., wherein such keys can be used to identify initiation and/or completion of a continuous sequence of strokes set forth by the user over the first portion 106 of the split virtual keyboard 104. Thus, for example, the user may desire to generate the word "hello" by way of a continuous sequence of strokes. The user can use the thumb of her first hand to set forth a sequence of strokes over keys in the first plurality of keys 110 (e.g., transitioning such thumb from a key that represents the character "h" to a key that represents the character "e" to a key that represents the character "l" to a key that represents the character "o"). The user can subsequently use the thumb of her second hand to select an "Enter" key from the second plurality of keys 112, thus indicating the completion of input for the word. In another example, at least one key in the second plurality of keys 112 can be a punctuation key, such that the key represents a period, comma, colon, semi-colon, question mark, exclamation point, etc. In still yet another example, keys in the second plurality of keys 112 may be numerical keys, emoticons, etc.

Moreover, at least one key in the second plurality of keys 112, when selected by the user, can cause a content of keys in the first plurality of keys 110 to alter. For example, the first plurality of keys 110 may initially include a plurality of character keys; when a key in the second plurality of keys 112 is selected by the user, a different keyboard can be displayed in the first portion 106 of the split virtual keyboard 104 (e.g., the character keys can be replaced with numerical keys). In still yet another example, the second plurality of keys 112 can include character keys, and input can be provided via performing a sequence of strokes over such character keys. For instance, the first plurality of keys 110 may include first character keys that are respectively representative of a first plurality of characters and the second plurality of keys 112 may include second character keys that are respectively representative of a second plurality of characters. The user can employ a first thumb to set forth a first continuous sequence of strokes over keys in the first plurality of keys 110 and a second thumb to set forth a second continuous sequence of strokes over keys in the second plurality of keys 112, analogously to a user typing with a left and right hand.

In another example, selection of at least one key in the second plurality of keys 112 can cause a format of a word generated by setting forth strokes over keys in the first plurality of keys 110 to alter. In an example, selection of the at least one key in the second plurality of keys 112 can cause the word to be italicized, displayed in bold, underlined, etc. Further, selection of the at least one key in the second plurality of keys can cause quotation marks to be placed around the word, can cause a first letter of the word to be capitalized, can cause all letters of the word to be capitalized, can cause font of the word to be altered, etc.

The system 100 comprises a detector component 114 that detects strokes set forth by the user over (at least) keys in the first portion 106 in the split virtual keyboard 104. Therefore, for example, the detector component 114 can detect a sequence of strokes set forth over character keys in the first plurality of keys 110 of the first portion 106 of the split virtual keyboard 104, wherein the user transitions the thumb of her first hand between keys in the first plurality of keys 110 that represent characters (or multiple characters).

A decoder component 116 is in communication with the detector component 114, and decodes a sequence of strokes over character keys in the first plurality of keys 110 set forth by the user of the mobile computing device, such that the decoder component 116 determines a sequence of characters (e.g., a word) desirably set forth by such user. Pursuant to an example, the decoder component 116 can receive a signal from the detector component 114 that is indicative of a sequence of strokes (e.g., a trace) set forth by the user over character keys in the first plurality of keys 110, wherein the user desirably sets forth the word "hello." The decoder component 116 can decode such sequence of strokes and output the word "hello." In an example, character keys in the first plurality of keys 110 can each represent a respective plurality of characters, such that the decoder component 116 can disambiguate between potential words that can be constructed based upon strokes set forth by the user (e.g., based upon characters in respective keys over which a trace of the digit has passed or to which the trace of the digit is proximate). Still further, the decoder component 116 can be configured to correct for possible spelling errors entered by the user, as well as errors in position of the thumb of the first hand of the user over character keys in the first plurality of keys 110 of the split virtual keyboard 104. As noted above, the split virtual keyboard 104 may be particularly well-suited for eyes-free entry of text by the user of the mobile computing device. Therefore, when the user is interacting with the split virtual keyboard 104, digits of the user may not be positioned precisely over respective keys that are desirably selected by the user.

In connection with performing such decoding, the decoder component 116 can comprise a stroke model 118 that is trained using labeled words and corresponding traces set forth over touch-sensitive input panels by users. With more particularity, during a data collection/model training phase, a user can be instructed to set forth a trace (e.g., continuous sequence of strokes) over a virtual keyboard arranged as the first portion 106 of the split virtual keyboard 104 for a prescribed word. Position of such trace can be assigned to the word, and such operation can be repeated for multiple different users and multiple different words. As can be recognized, variances can be learned and/or applied to traces for certain words, such that the resultant stroke model 118 can relatively accurately model sequences of strokes for a variety of different words in a predefined dictionary.

Furthermore, the decoder component 116 can include a language model 120 for a particular language, such as, English, Japanese, German, or the like. The language model 120 can be employed in connection with probabilistically disambiguating between potential words based upon previous words set forth by the user. It can, therefore, be ascertained that the decoder component 116 can be a statistical decoder, where a sequence of strokes set forth by a user can be converted to her intended word or sequence of words, wherein the statistical decoder takes into account both how likely it is that those strokes were produced by a user intending such words (e.g., how well the strokes match the intended word), and how likely those words are, in fact, the words intended by the user (e.g., "chewing gum" is more likely than "chewing gun"). Accordingly, the stroke model 118 may be a hidden Markov model (HMM), and the language model 120 may be an N-gram language model.

The system 100 may further optionally include a speaker 122 that can audibly output a word or sequence of words identified by the decoder component 116 based upon sequences of strokes detected by the detector component 114. In an exemplary embodiment, the speaker 122 can audibly output the word "hello" in response to the user performing a sequence of strokes over character keys in the first plurality of keys 110 that are representative of the characters "h," "e," "l," and "o." Therefore, the user need not look at the touch-sensitive display 102 to receive confirmation that the word desirably entered by the user has been accurately identified by the decoder component 116. Further, if the decoder component 116 incorrectly identifies a word based upon a sequence of strokes detected by the detector component 114, the user can receive audible feedback that informs the user of the incorrect decoding of sequence of strokes. For instance, if the decoder component 116 determines (incorrectly) that the word desirably set forth by the user is "orange" rather than "hello," then the user can quickly ascertain that the decoder component 116 has incorrectly decoded the sequence of strokes set forth by the user. The user may then press some button (e.g., in the second plurality of keys 112) that can cause the decoder component 116 to output a next most probable word, which can then be audibly output by the speaker 122. This process can continue until the user hears the word desirably generated by such user. In another exemplary embodiment, the user, by way of a gesture, voice command, interaction over keys in the second plurality of keys 112, etc., can indicate a desire to re-perform a sequence of strokes, such that the previously output word is deleted. In still another example, the decoder component 116 can identify a word prior to the sequence of strokes being completed, and can cause such word to be displayed prior to the sequence of strokes been completed. For instance, as the user sets forth a sequence of strokes, a plurality of potential words can be displayed to the user on the touch-sensitive display 102. The user, for instance, may employ at least one key in the second plurality of keys 112 of the split virtual keyboard 104 to select a word from the plurality of words displayed on the touch-sensitive display 102.

Furthermore, it can be recognized that the decoder component 116 can employ active learning to update the stroke model 118 and/or the language model 120 based upon feedback set forth by the user of the mobile computing device that comprises the system 100. Thus, the stroke model 118 can be refined based upon size of the thumb of the user used to set forth traces over the first portion 106 of the split virtual keyboard 104. In another example, the stroke model 118 can be refined based upon shapes of traces set forth by the user over keys in the first portion 106 of the split virtual keyboard 104. Similarly, a dictionary utilized by the stroke model 118 and/or the language model 120 can be updated based upon words frequently employed by the user of the computing device that comprises the system 100 and/or an application being executed.

For instance, if the user desires to set forth a name of a person that is not included in a dictionary of the stroke model 118, the user can inform the decoder component 116 of the name, such that sequences of strokes corresponding to such name can be recognized and decoded by the decoder component 116. In another example, a dictionary can be customized based upon an application being executed. For instance, words/sequences of characters set forth by the user when employing a text messaging application may be different from words/sequences of characters set forth by the user when employing an e-mail or word processing application. Similarly, keys and/or arrangement of keys in the first portion 106 and the second portion 108 of the split virtual keyboard 104 may be dependent upon an application being executed by the computing device that comprises the system 100. For example, if the computing device is executing a browser, and the split virtual keyboard 104 is being employed in connection with generating a URL for provision to the browser, the first plurality of keys 110 may include character keys, while the second plurality of keys 112 may include a ".com" key. In another example, if the computing device is executing a text messaging application, keys in the first plurality of keys 110 may be character keys, while keys in the second plurality of keys 112 may represent emoticons.

In certain situations, the user of the computing device (the split virtual keyboard 104) may desire to generate text that is not included in a dictionary employed by the stroke model 118 and/or the language model 120. Such text may include a name, a slang term, etc. In an exemplary embodiment, the user can cause a full keyboard to be displayed on the touch-sensitive display 102, such that conventional techniques may be employed to press discrete keys to enter the desired text. In another example, the decoder component 116 may include a handwriting recognizer component 124 that can recognize handwritten letters set forth by the user over a portion of the touch-sensitive display 102. In an example, the user may desire to set forth the sequence of characters "whooooaah." Such sequence of characters may not be included in a dictionary used to decode traces by the stroke model 118 and/or the language model 120. To allow the user to set forth such sequence of characters without having to use a full keyboard or to look directly at the split virtual keyboard 104, the system 100 can support handwriting recognition, wherein the user can cause at least a portion of the split virtual keyboard 104 to act as a canvas for setting forth handwritten scripts (e.g., words, punctuations, symbols, characters, etc.). For instance, through selection of a key in the second plurality of keys 112, a particular gesture, a voice command, or the like, the first plurality of keys 110 can be replaced with a canvas upon which the user can set forth handwritten characters with the thumb of her first hand. The user may then trace characters over the first portion 106 of the split virtual keyboard 104, and the handwriting recognizer component 124 can recognize characters being handwritten by the user. Therefore, the user can first can write the letter "w" over the first portion 106 of the split virtual keyboard 104, and then may set forth a gesture indicating that the character has been completed. The user may thereafter handwrite the letter "h," which again can be recognized by the handwriting recognizer component 124. This process can continue until the user has set forth the desired sequence of characters. Thereafter, the user, through a voice command, gesture, depression of a button in the second portion 108 of the split virtual keyboard 104, or the like, can cause the split virtual keyboard 104 to return to a default state, where text entry via strokes is supported. Other modes are also contemplated, such as a mode that supports discrete tapping of keys, if such modes are desired by the user.

The system 100 may optionally include a microphone 126 that can receive voice input from the user. The user, as noted above, can set forth a voice indication that the decoder component 116 has improperly decoded a sequence of strokes, and the microphone can receive such voice indication. In another exemplary embodiment, the decoder component 116 can optionally include a speech recognizer component 128 that is configured to receive spoken utterances of the user (captured by the microphone 126) and recognize words therein. In an exemplary embodiment, the user can verbally input words that are also entered by way of a trace over character keys in the first portion 106 of the split virtual keyboard 104, such that the spoken word supplements the sequence of strokes and vice versa. Thus, for example, the stroke model 118 can receive an indication of a most probable word output by the speech recognizer component 128 and can utilize such output to further assist in decoding a sequence of strokes set forth over keys in the first portion 106 of the split virtual keyboard 104. In another embodiment, the speech recognizer component 128 can receive a most probable word output by the stroke model 118 based upon a trace detected by the detector component 114, and can utilize such output as a feature for decoding the spoken utterance received from the microphone 126. The utilization of the speech recognizer component 128, the stroke model 118, and the language model 120 can thus operate together to improve accuracy of decoding.

While not shown, the system 100 may optionally comprise hardware and/or software that facilitates tracking gaze of the user, which can be used to supplement decoding of the sequence of strokes set forth by the user. For instance, a camera and associated software can be configured to estimate the location of the gaze of the user, which can be provided as input to the decoder component 116. In yet another exemplary embodiment, the system 100 may comprise hardware and/or software that facilitates receipt of neural data, such as electrostatic signals emitted from a body of the user. Again, such information can be employed as input to the decoder component 116 and can be used in connection with decoding the sequence of strokes set forth by the user.

Other exemplary features pertaining to the split virtual keyboard 104 will now be described. For example, the first portion 106 and the second portion 108 of the split virtual keyboard 104 can be ergonomically arranged to facilitate receipt of strokes from the thumbs of the user while the user is gripping a mobile computing device comprising the system 100. Thus, the first plurality of keys 110 can be angularly offset from a bottom edge, top edge, and side edge of the touch-sensitive display 102, such that the lines defining boundaries of keys in the first plurality of keys 110 are not parallel with edges of the touch-sensitive display 102. Moreover, as will be shown below, the keys can be curved, arced or slanted, relative to edges of the touch-sensitive display 102.

Additionally, to facilitate development of muscle memory with respect to particular sequences of strokes that are repeated by the user, different portions of the first portion 106 and/or the second portion 108 of the split virtual keyboard 104 may be provided with different textures relative to other portions of the split virtual keyboard 104. For instance, as shown, keys in the first plurality of keys 110 and keys in the second plurality of keys 112 may be separated by respective boundaries. The touch-sensitive display 102 can be configured to output haptic feedback as a digit of the user transitions over boundaries between keys in the first portion 106 and/or the second portion 108. Specifically, for instance, as a digit of the user crosses a boundary between keys in the first plurality of keys 110 when setting forth a sequence of strokes, an electrostatic signal can be output by the touch-sensitive display 102, such that the user perceives increased friction as the thumb crosses such boundary (e.g., the feedback is localized). In other examples, keys in the first plurality of keys 110 may be associated with haptic feedback, such that from the perception of the user, it feels as if different keys have different textures. Thus, by feel, the user can differentiate between keys in the first plurality of keys 110 and keys in the second plurality of keys 112. That is, a first key may feel to the user as being smoother than a second key.

It is also to be understood that text generation via a sequence of strokes over keys in the first portion 106 of the split virtual keyboard 104 can be used in connection with performing a global search over a data store or collection of data stores associated with a computing device that comprises the system 100. For instance, a user may indicate a desire to search over contents of a particular application or data repository. Thereafter, the user can employ a continuous sequence of strokes, as described above, to generate text that is desirably used as a query. For instance, the user may desire to search for a contact in a list of contacts. The user can employ a continuous sequence of strokes to search for the name of the contact. For instance, after selecting a plurality of keys through a sequence of strokes over the first portion 106 of the split virtual keyboard 104, the computing device can audibly output a name that is being searched for that corresponds to the plurality of strokes. Thereafter, the user can cause an action to be undertaken with respect to the selected contact. For instance, the user can indicate a desire to e-mail the contact, place a call to the contact, etc. It is to be understood that the above is an example of a query that can be performed through utilization of text generation via a continuous sequence of strokes, and the type of global search that can be performed using aspects associated with FIG. 1 is not limited by such example.

In still yet another example, at least one of the first portion 106 or the second portion 108 of the split virtual keyboard 104 can be employed in connection with launching applications, presenting menus, and/or selecting files. For example, the detector component 114 can detect an input gesture on the touch-sensitive display 102 that is associated with launching applications, presenting menus, and/or selecting files. Such input gesture can be performed over the first portion 106 or the second portion 108 of the split virtual keyboard 104. In another example, the gesture can be performed on the touch-sensitive display 102 when the split virtual keyboard 104 is not displayed thereon. Responsive to the detector component 114 detecting the gesture, the display component 103 can cause a list of applications, selectable menu options, and/or files to be displayed on the touch-sensitive display 102. Additionally, the display component 103 can cause at least the first portion 106 of the split virtual keyboard 104 to be displayed (if not already displayed) on the touch-sensitive display 102. The first portion 106 of the split virtual keyboard 104 can be employed, for instance, to set forth text that can be employed in connection with searching for and/or selecting an application, menu option, and/or file.

Figure 2:
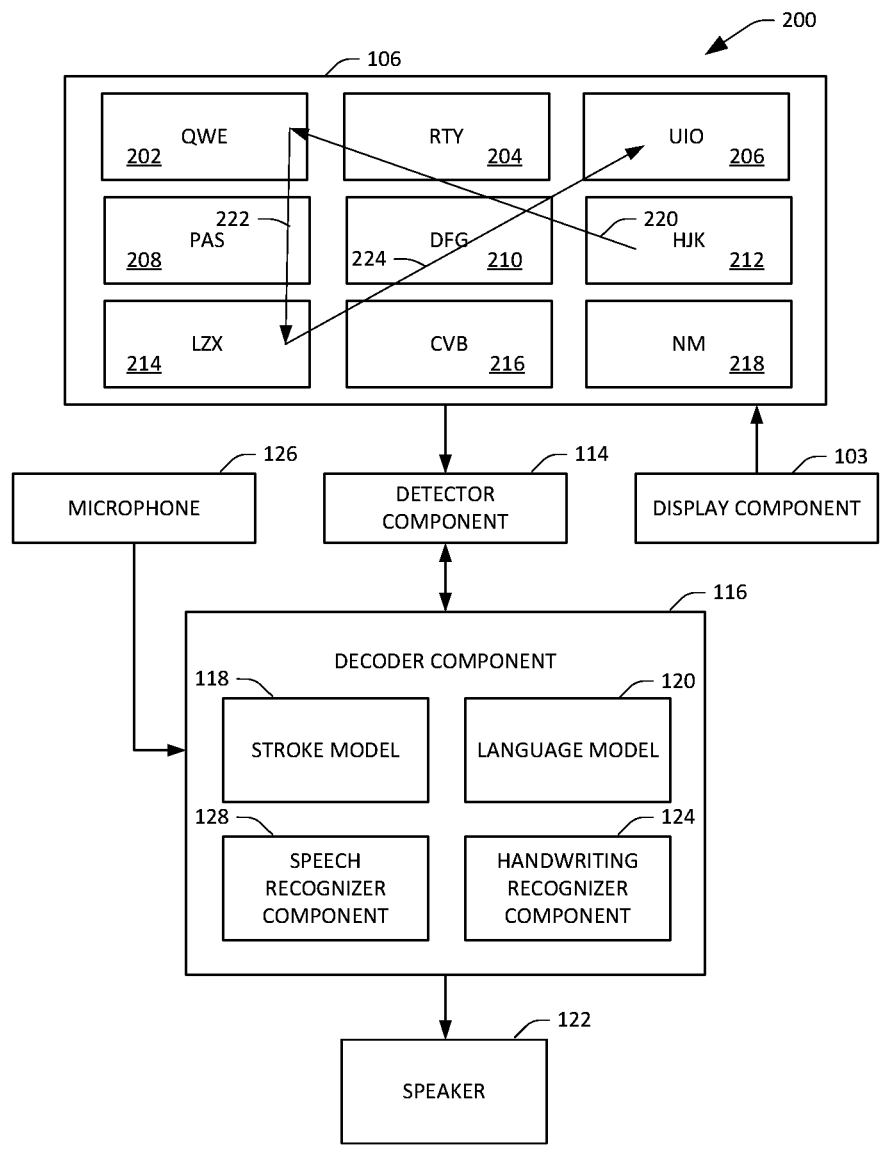
FIG. 2 is a functional block diagram of an exemplary system that facilitates generation of text by way of a continuous trace.

With reference now to FIG. 2, an exemplary system 200 that facilitates generation of text by way of a continuous sequence of strokes is illustrated. The system 200 includes the first portion 106 of the split virtual keyboard 104, wherein the first plurality of keys 110 include a plurality of character keys 202-218. As shown, each key the plurality of character keys 202-218 can represent a respective plurality of characters. As will be illustrated below, the first portion 106 of the split virtual keyboard 104 may also include additional keys, such as an "Enter" key, a "Spacebar" key, numerical keys, and other keys found on conventional keyboards.

Each of the keys 202-218 shown as being included in the first portion 106 of the split virtual keyboard 104 is representative of a respective plurality of characters. For instance, the key 202 is representative of the characters "Q," "W," and "E," the key 204 is representative of the characters "R," "T," and "Y," etc. It is to be understood that the characters in the first portion 106 of the split virtual keyboard 104 can be arranged in accordance with a QWERTY keyboard, alphabetically, or some other suitable arrangement.

In an example, a user may wish to employ a thumb of her first hand to set forth the word "hello" by way of a continuous sequence of strokes. To do so, the user may place the thumb of her first hand on the key 212, which represents the characters "H," "J," and "K." The user may then transition the thumb of her first hand from the key 212 to the key 202, which represents the characters "Q," "W," and "E." The transition from the key 212 to the key 202 is shown as being a first stroke 220. While the digit maintains contact with the touch-sensitive display 102, the user can transition the thumb of her first hand from the key 202 to the key 214, which represents the characters "L," "X," and "Z." Therefore, by transitioning from the key 202 to the key 214, the user has set forth a second stroke 222, which can indicate that the user has selected keys representative of the first three letters of the word "hello."

At this point, the user may desire to indicate a subsequent selection of the letter "L" in the word "hello." This can be undertaken in a variety of manners. In an example, the user can set forth a third stroke 224, which may be a circular stroke undertaken over the key 214. Accordingly, through a relatively small stroke, the user can indicate that she desires to select another character represented by the key 214. In another exemplary embodiment, the user can pause over the key 214 without setting forth another stroke. Again, such pause can be indicative of a desire to consecutively select the key 214. In another embodiment, the user can cause her thumb to immediately transition to another key. Thus, the user may then set forth a third stroke 224 by transitioning her thumb from the key 214 to the key 206, and thereafter may lift her thumb from the touch-sensitive display 102. Alternatively, the user may set forth a command using a thumb of her second hand (e.g., by selecting a key in the second portion 108 of the split virtual keyboard 104). While the sequence of strokes 220-224 is shown as being discrete strokes, it is to be understood that, in practice, a trace of the thumb of the user over the touch-sensitive-display 102 may appear as a continuous curved shape with no readily ascertainable differentiation between strokes.

Figure 3:
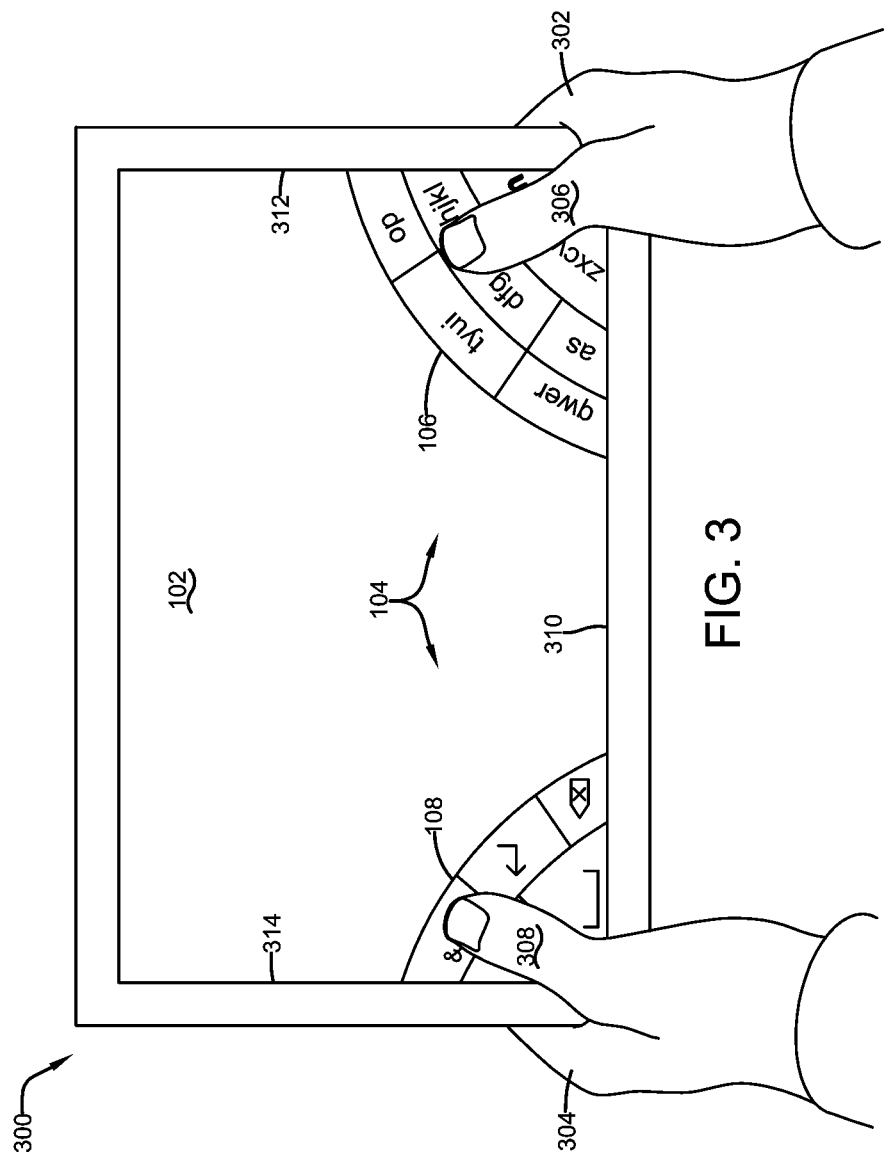
FIG. 3 illustrates an exemplary tablet computing device with a split virtual keyboard displayed thereon.

Now referring to FIG. 3, an exemplary tablet computing device 300 is shown. The tablet computing device 300 includes the touch-sensitive display 102, which displays the split virtual keyboard 104 (e.g., including the first portion 106 that is split from the second portion 108). As tablet computing devices can be difficult to hold with one hand, the tablet computing device 300 is shown as being held by a user with a first hand 302 and a second hand 304. The first portion 106 of the split virtual keyboard 104 is shown as being positioned on the touch-sensitive display 102 to facilitate receipt of input from a thumb 306 of the first hand 302 of the user when the user is gripping the tablet computing device 300. Likewise, the second portion 108 of the split virtual keyboard 104 is positioned to facilitate receipt of input from a thumb 308 of the second hand 304 of the user when the user is gripping the tablet computing device 300.

Pursuant to an example, the split virtual keyboard 104 can be invoked by a gesture set forth by the user. For instance, such gesture may include a radial swiping of the thumb 306 of the first hand 302 of the user from a bottom edge 310 of the touch-sensitive display 102 to a right edge 312 of the touch-sensitive display 102 (from a perspective of the user). This may cause the split virtual keyboard 104 to be presented on the touch-sensitive display 102 with a size that corresponds to an extent of the thumb 306 of the first hand 302 of the user when invoking the split virtual keyboard 104. The second portion 108 can have a size that maps to the determined size of the first portion 106. In an alternative embodiment, the gesture may be sequential radial swipes of the thumbs 306 and 308 of the first hand 302 and the second hand 304, respectively, from the bottom edge 310 of the display to the right edge 312 and a left edge 314 of the touch-sensitive display 102, respectively (e.g., the thumb 306 of the first hand 302 performs a swipe followed by the thumb 308 of the second hand 304, or vice versa). In another example, the gesture may be simultaneous swipes of the thumbs 306 and 308. Sizes and positions of the first portion 106 and the second portion 108 of the split virtual keyboard 104, respectively, may be a function of the radial extent of the thumb 306 and the thumb 308 when performing the aforementioned gesture.

In an exemplary embodiment, the first hand 302 may be the dominant hand of the user, such that the first portion 106 includes character keys and the user can set forth a continuous sequence of strokes using the thumb 306 of the first hand 302 over such character keys to generate text. The second portion 108 of the split virtual keyboard 104 can include keys that can support decoding of text and/or refinement of text generated through use of the thumb 306 of the first hand 302. As indicated above, the second portion 108 may include a "mode" key that, when selected by the thumb 308 of the second hand, can cause the case of characters represented by keys in the first portion 106 to be changed from lowercase to uppercase or vice versa, can cause language of keys in the first portion 106 to change, etc.

While the split virtual keyboard 104 is shown as being presented when the tablet computing device 300 is held by the user in a landscape orientation, it is to be understood that the split virtual keyboard 104 can be presented when the tablet computing device 300 is held by the user in a portrait orientation. Additionally, while the first portion 106 and the second portion 108 are shown as being displayed in respective corners of the touch-sensitive display 102, it is to be understood that the first portion 106 and the second portion 108 may be located in accordance with the detected location of the grip of the user holding the tablet computing device 300. Therefore, if it is detected that the user is gripping the tablet computing device 300 near centers of the first edge 312 and second edge 314, the first portion 106 and the second portion 108 may be displayed above the aforementioned corners of the touch-sensitive display 102.

Figure 4:
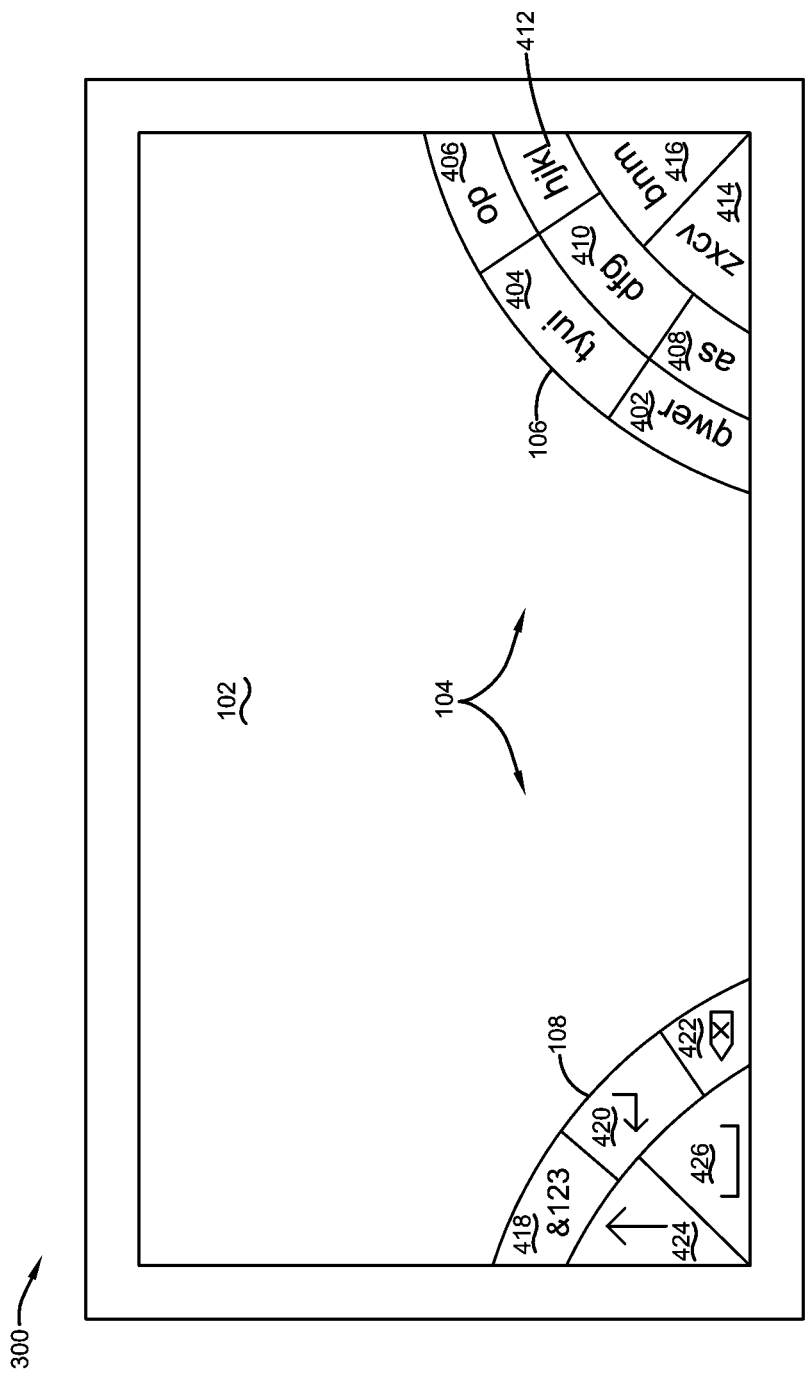
FIGS. 4-8 illustrate exemplary split virtual keyboards.

Now referring to FIG. 4, the tablet computing device 300 is illustrated, wherein the split virtual keyboard 104 is displayed on the touch-sensitive display 102 and has an exemplary layout. As shown, the first portion 106 of the split virtual keyboard 104 can comprise a plurality of character keys 402-416, wherein each key in the character keys 402-416 is representative of a respective plurality of characters.

The second portion 108 of the split virtual keyboard 104 includes a plurality of keys 418-426, which can be selected by the thumb 308 of the second hand 304 of the user (e.g., via tapping). For instance, the keys 418 and 424 can be "mode" keys that cause the layout/values of keys in the first portion 106 of the split virtual keyboard 104 to alter. Pursuant to an example, if the user selects the key 418, the plurality of keys 402-416 in the first portion 106 of the split virtual keyboard 104 can be replaced with keys representative of the numbers zero through nine (e.g., a nine key keyboard). In another example, if the user selects the key 424 from the second portion 108 of the split virtual keyboard 104, the characters represented by the keys 402-416 can change from being displayed in lowercase to being displayed in uppercase. The key 420 in the second portion 108, when selected by the thumb 308 of the second hand 304 of the user, can cause text entered by way of the plurality of keys 402-416 to be finalized/output to an application. Therefore, in an example, after the user has generated the word "hello" using the thumb 306 of her first hand 302, the user may then select the key 420 with the thumb 308 of her second hand 304, which causes the word "hello" to be output.

The key 422 in the second portion 108 can be a "Backspace" key that causes a most recently generated word to be deleted when selected by the thumb 308 of the second hand 304 of the user. For instance, if the decoder component 116 improperly identified a word based upon a trace set forth by the user, the user can cause such word to be deleted through selection of the key 422. Still further, the second portion 108 of the split virtual keyboard 104 can include a "Spacebar" key 426, which can indicate completion of a trace set forth by the thumb 306 of the first hand 302 of the user over keys in the first portion 106. Thus, continuing with the example above, if the user has set forth a sequence of strokes corresponding to the word "hello" over keys in the first portion 106 of the split virtual keyboard 104, the user can select the key 426 in the second portion 108, which indicates that the sequence of strokes has been completed.

Figure 5:
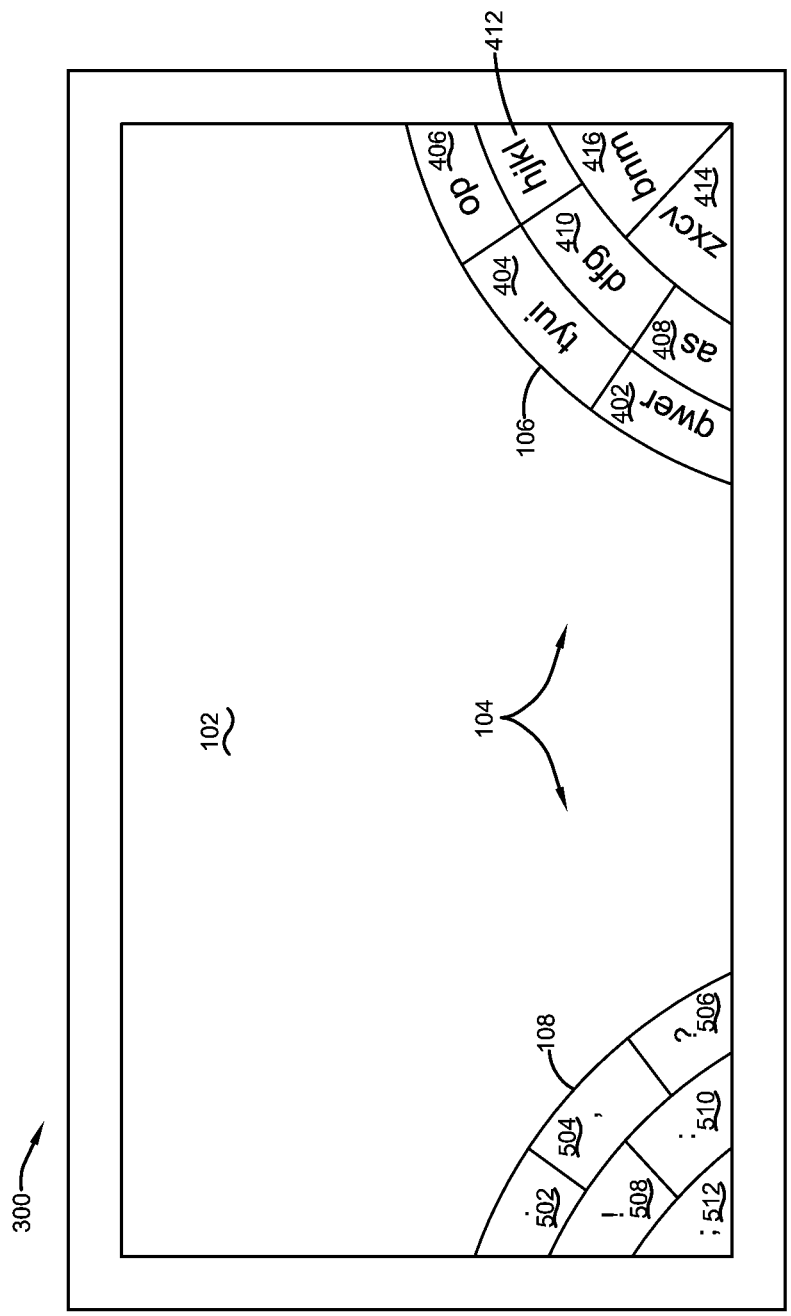

Now referring to FIG. 5, the tablet computing device 300 is illustrated, wherein the split virtual keyboard 104 is shown with another exemplary layout. As shown in FIG. 5, the first portion 106 includes the plurality of character keys 402-416, wherein each character key is representative of a respective plurality of characters. In the exemplary layout shown here, the second portion 108 of the split virtual keyboard 104 includes a plurality of keys 502-512 that are respectively representative of a plurality of punctuation marks. Specifically, the key 502 can represent a period, the key 504 can represent a comma, the key 506 can represent a question mark, the key 508 can represent an exclamation point, the key 510 can represent a colon, and the key 512 can represent a semi-colon. Using the exemplary layout shown in FIG. 5, the user can employ the thumb 306 of her first hand 302 in connection with generating words through a continuous sequence of strokes, and can employ the thumb 308 of her second hand 304 to add punctuation to a word, phrase, or sentence.

Figure 6:
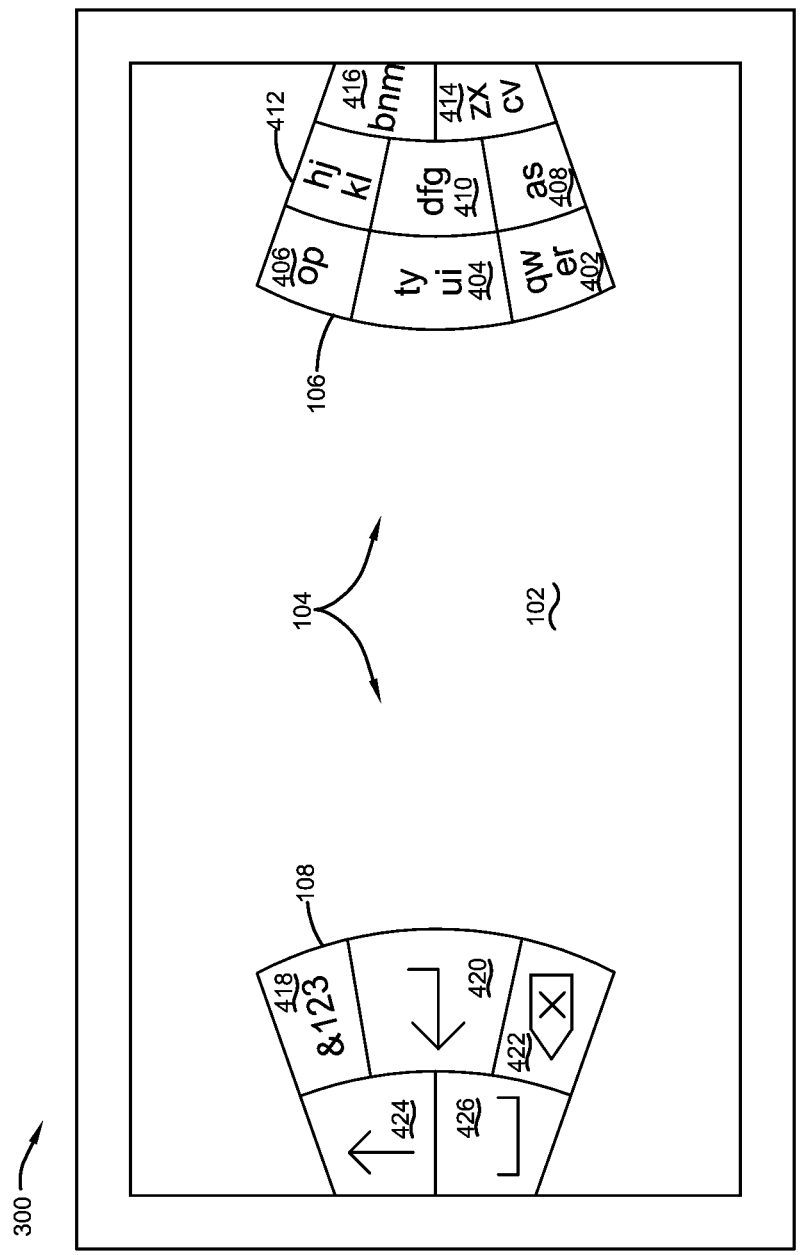

With reference now to FIG. 6, the tablet computing device 300 is shown as displaying another exemplary layout of the split virtual keyboard 104. In the exemplary layout shown in FIG. 6, the first portion 106 includes the keys 402-416, and the second portion 108 of the split virtual keyboard 104 includes the keys 418-422. Rather than the first portion 106 being displayed in the bottom right-hand corner of the touch-sensitive display 102, and the second portion 108 being displayed in a bottom left-hand portion of the touch-sensitive display 102 (from the perspective of the user), the first portion 106 and the second portion 108 of the split virtual keyboard 104 are shown as being positioned more proximate to a middle of the touch-sensitive display 102. For example, when initiating the split virtual keyboard 104, the thumbs 306 and 308 of the user can be detected as being more proximate to the center of the touch-sensitive display 102, such that the user is gripping the tablet computing device 300 on its sides, rather than at the bottom corners. Accordingly, the first portion 106 and the second portion 108 are positioned to correspond to the location of the hands of the user when the user is gripping the tablet computing device 300. Further, it is to be understood that the user can manually move and dock the first portion 106 and the second portion 108 to facilitate provision of gestures with the thumbs 306 and 308 of the user over the first portion 106 and the second portion 108, respectively.

Figure 7:
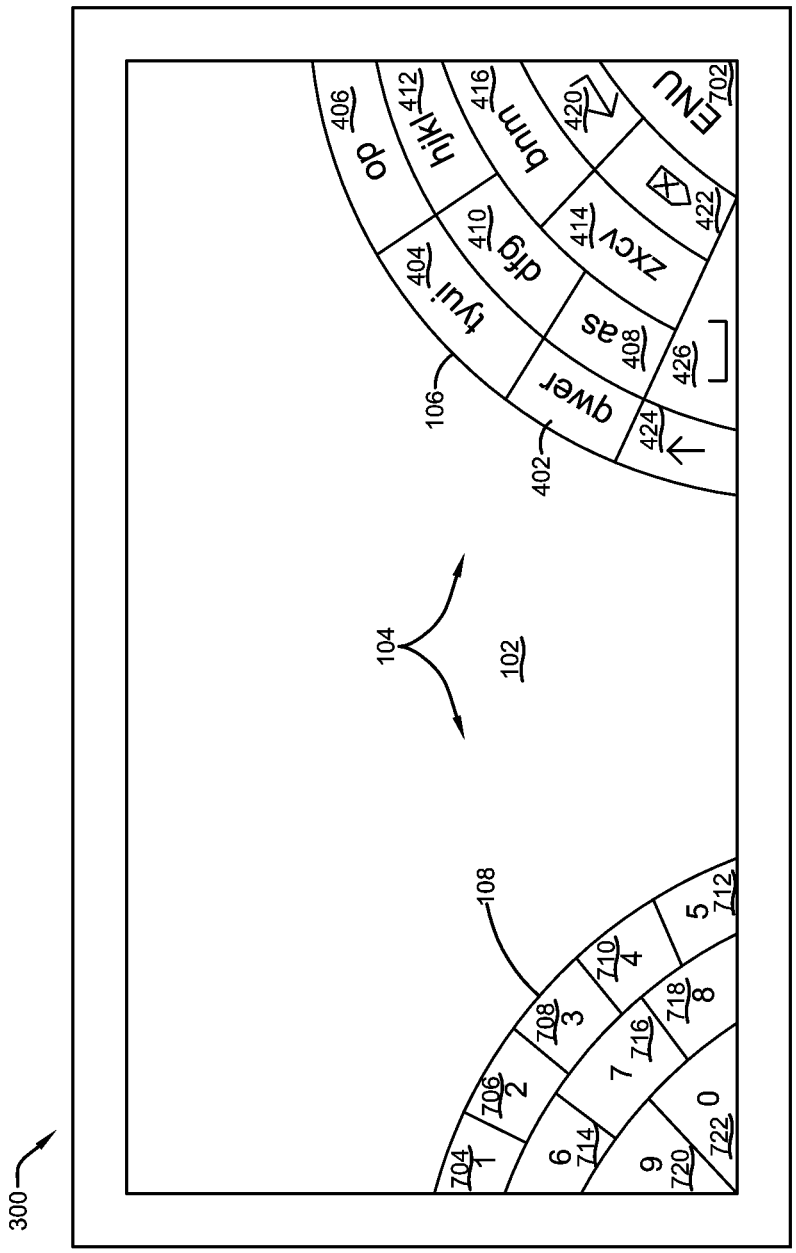

Now referring to FIG. 7, the tablet computing device 300 is shown, wherein the tablet computing device 300 displays yet another exemplary layout of the split virtual keyboard 104. In the exemplary layout of FIG. 7, the first portion 106 includes the first plurality of keys 402-416. The first portion 106 is also shown as including the keys 420-426, which were illustrated as being included in the second portion 108 in the exemplary layout shown in FIG. 4. The first portion 106 is also shown as including a key 702, which can cause characters represented by keys 402-416 to be displayed in another language. For example, selection of the key 702 by the thumb 306 of the first hand 302 of the user can cause a character shown in the first portion 106 to change from English to Japanese, from Japanese to Chinese, etc.

The second portion 108 of the split virtual keyboard 104 includes a plurality of key 704-722 that are representative of respective numbers. That is, the second portion 108 includes keys of a numeric keyboard. Thus, the user may employ her thumb 306 of the first hand 302 to set forth words by way of a continuous sequence of strokes, change modes of the keys in the first portion 106, etc., and may use the thumb 308 of her second hand 304 to select appropriate numbers.

Figure 8:
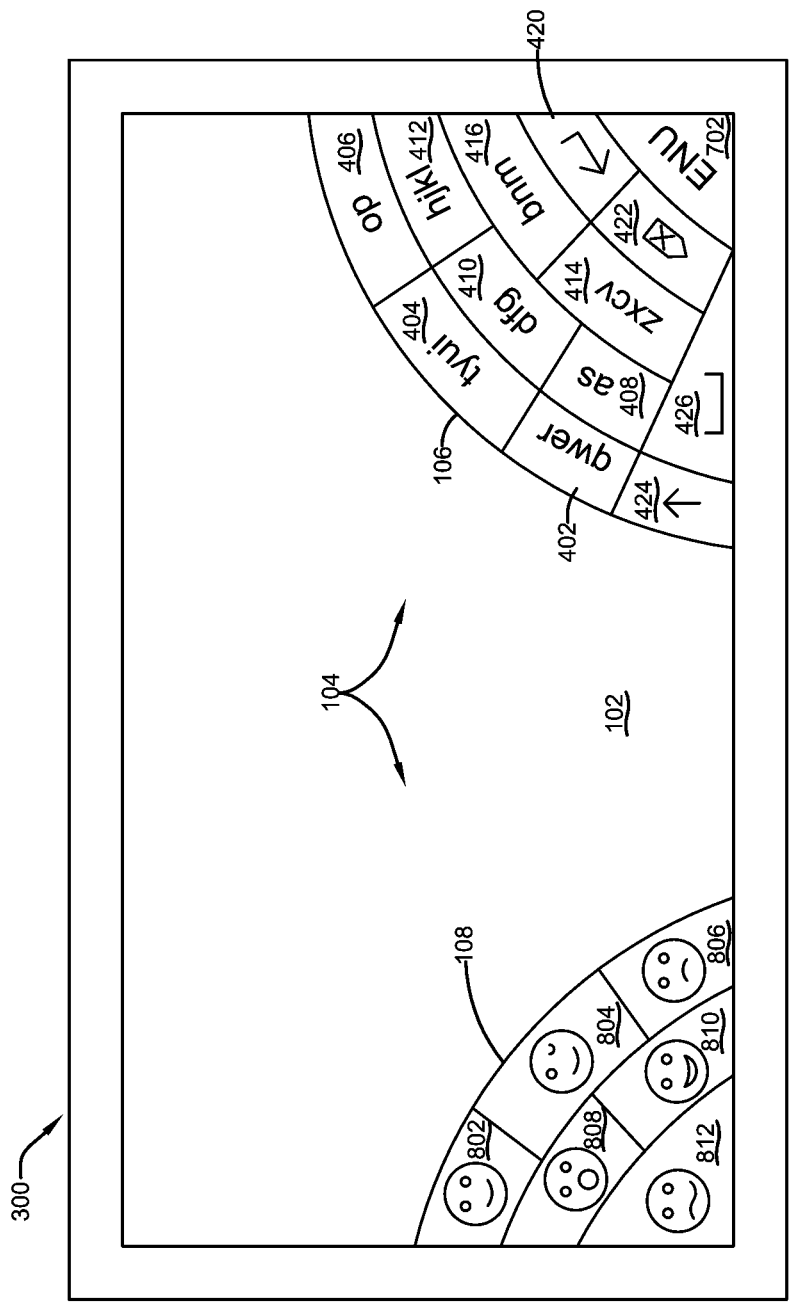

With reference now to FIG. 8, the tablet computing device 300 is again illustrated, wherein another exemplary layout of the split virtual keyboard 104 is displayed on the touch-sensitive display 102. In the exemplary layout shown in FIG. 8, the first portion 106 includes keys as shown in the exemplary layout of FIG. 7. The second portion 108 includes a plurality of keys that are representative of a respective plurality of emoticons. For instance, such layout may be particularly well-suited for a text messaging application or an e-mail application, where users frequently submit emoticons with transferred text. Thus, in an example, a user may set forth a word or phrase by way of a continuous sequence of strokes over keys in the split virtual keyboard 104, and may then include an emoticon with such words by selecting an appropriate key from the keys 802-812 through employment of the thumb 308 of her second hand 304.

FIGS. 4-8 have been set forth to provide examples of layouts that may be included in a split virtual keyboard that can be presented on a tablet computing device. It is to be understood, however, that other layouts or contemplated. Moreover, as shown, the first portion 106 and the second portion 108 can be ergonomically arranged to map to the radial extents of the thumbs 306 and 308 of hands of the user gripping the tablet computing device 300. Therefore, the user can set forth text when holding the tablet computing device 300 in a natural manner. Further, the exemplary layouts have been shown as having respective curved upper boundaries and curved internal boundaries that are concentric with the curved upper boundaries, while having linear internal boundaries between keys. In other embodiments, each boundary may be linear, and slanted relative to edges of the touch-sensitive display to facilitate entry of input by the thumbs 306 and 308 of the user. In addition, it is to be understood that layout of the split virtual keyboard 104 can change depending upon an application being executed by the tablet computing device 300. For instance, a first layout can be used for an e-mail application, and a second layout can be used for a word processing application.

Figure 9:
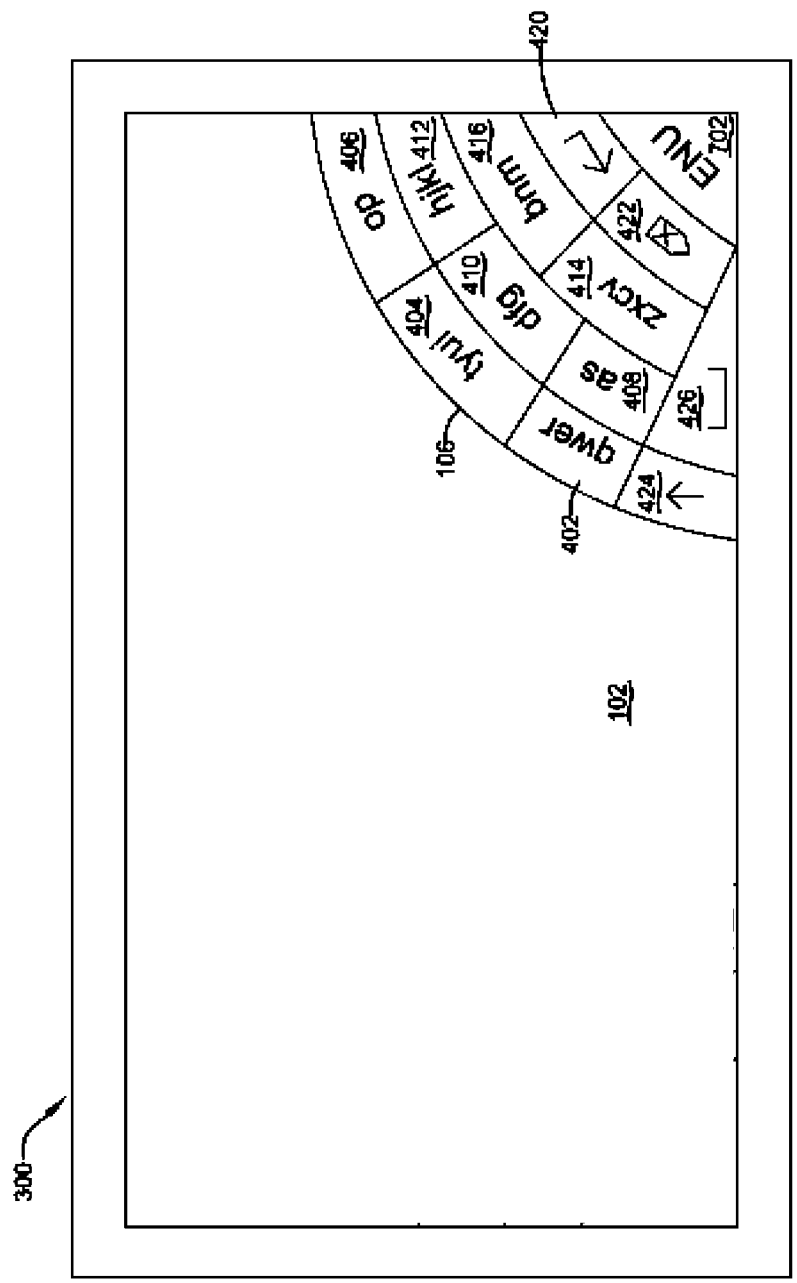
FIG. 9 illustrates an exemplary keyboard for utilization on a mobile computing device.

Now referring to FIG. 9, the tablet computing device 300 is illustrated, wherein only the first portion 106 is displayed on the display screen 102 of the tablet computing device. As shown, an outer boundary of the first portion 106 intersects a bottom edge and a right-side edge of the display screen 102, causing a relatively large amount of display real-estate to remain to depict application data, selectable icons, a desktop environment, etc. Accordingly, using the layout shown in FIG. 9, the user can generate text via a continuous sequence of strokes over keys in the first portion 106 while viewing content displayed on a remainder of the display screen 102.

Moreover, due to the relatively small size of the first portion 106, a mobile telephone, mobile media device, or phablet computing device can have the first portion 106 displayed thereon, wherein such first portion 106 has similar or identical size across computing device. Thus, for instance, a user may develop muscle memory when generating text via a continuous sequence of strokes over keys in the first portion 106 when using such first portion 106 on a mobile telephone. The user can then utilize such muscle memory to generate text via a continuous sequence of strokes over keys in the first portion 106 when displayed on the tablet computing device 300. It is further to be understood that the first portion 106 can be moved and docked at a location on the display screen 102 as desired by the user.

Figure 10:
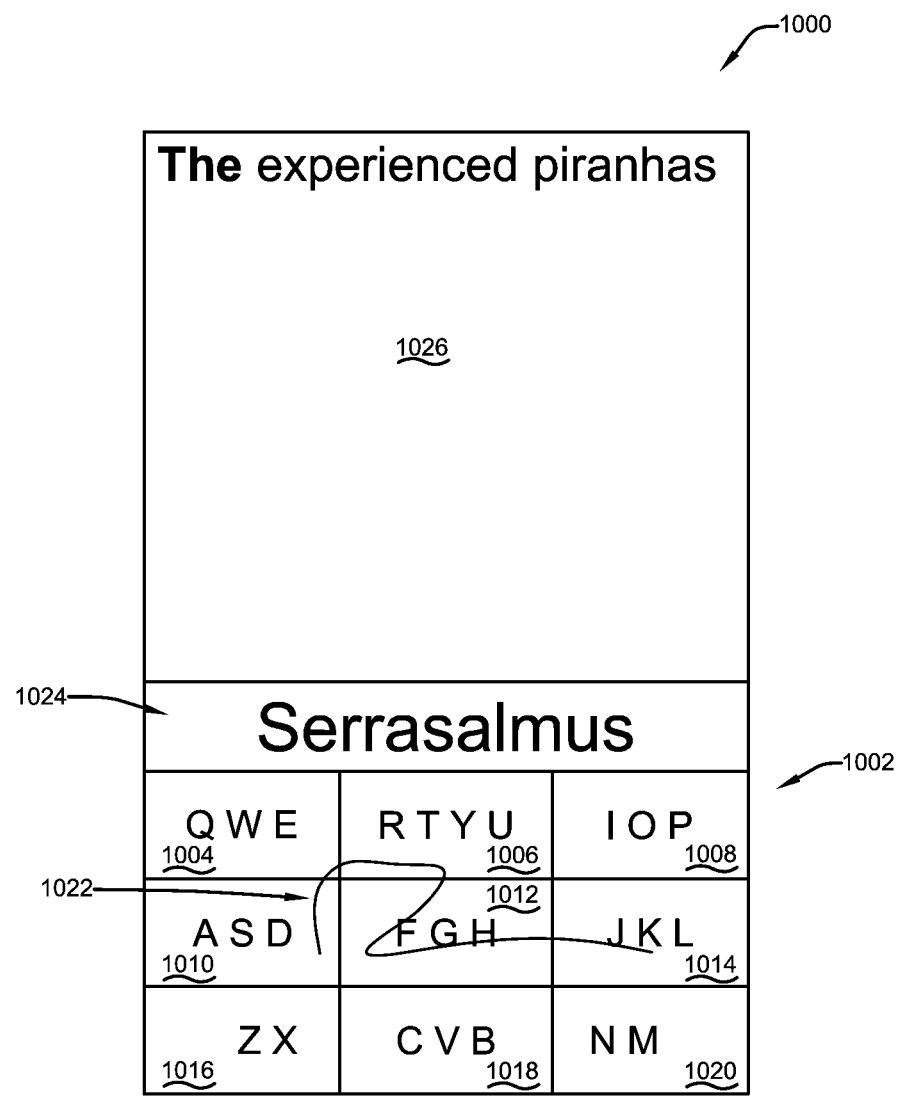
FIGS. 10-11 illustrate exemplary graphical user interfaces (GUIs) pertaining to generating text by way of continuous sequences of strokes set forth over character keys in a soft input panel (SIP).

With reference now to FIG. 10, an exemplary graphical user interface (GUI) 1000 that can be presented to a user on a touch-sensitive display of a mobile computing device is illustrated. The graphical user interface 1000 comprises a SIP 1002, wherein the SIP 1002 comprises a plurality of character keys 1004-1020. The GUI 1000 supports generation of text by way of continuous traces, and the exemplary GUI 1000 includes an exemplary continuous trace 1022.

The GUI 1000 further includes a suggestion region 1024, wherein an identified character sequence is presented for selection by the user. For instance, the decoder component 116 can decode the continuous trace 1022 and output the word "Serrasalmus" in real-time as a thumb of the user generates the continuous trace 1022 over character keys in the SIP 1002.

The GUI 1000 also comprises an output region 1026, wherein words corresponding to previously decoded traces are displayed. In the example shown in FIG. 10, three continuous traces have previously been decoded by the decoder component 116 prior to the user setting forth the continuous trace 1022, wherein such previous traces have been decoded as being the words "The," "experienced," and "piranhas." Pursuant to an example, words can be visually depicted in the output region 1026 based upon a finality or certainty corresponding to such words. In an example, finalized words can be displayed in a first manner, and non-finalized words can be depicted in a second manner. Whether or not a word is finalized can depend upon user input (or lack thereof) with respect to the word, as well as the language model 120. For instance, if the language model 120 is a tri-gram language model, then a word is finalized if two continuous traces are set forth without receipt of input indicating that the decoder component 116 improperly decoded a continuous trace for the word. In the example of FIG. 10, "The" is finalized and is shown in black in the output region 1026, while "experienced" and "piranha" are not finalized and are shown in grey in the output region 1026.

Figure 11:
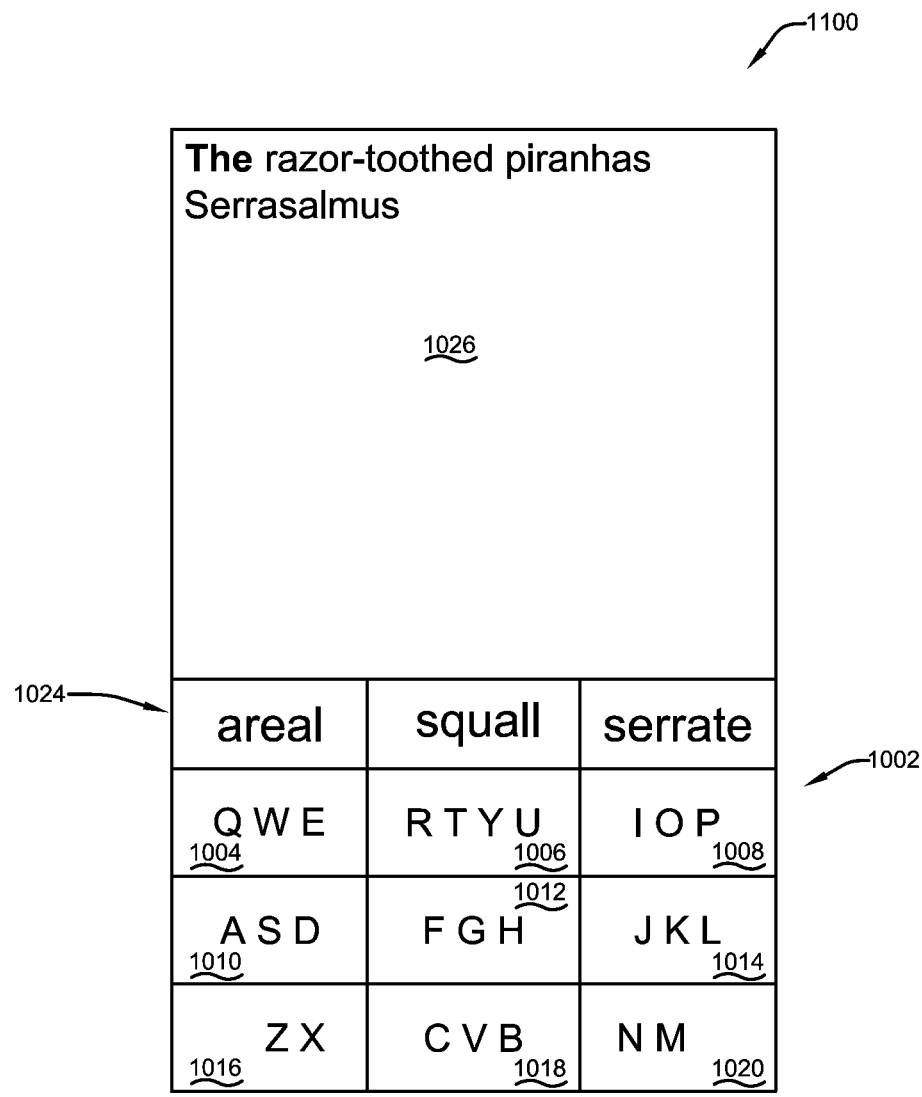

Now referring to FIG. 11, another exemplary GUI 1100 is illustrated. The GUI includes the SIP 1002, the suggestion region 1024, and the output region 1026. The suggestion region 1024 and the output region can be updated responsive to detecting that the user has lifted her thumb from the display screen. Specifically, the most probable word as identified by the decoder component 116 can be displayed in the output region 1026, and one or more next most probable words can be displayed in the suggestion region 1024. As shown in the GUI 1100, the suggestion region 1024 can be partitioned into three regions, wherein each region comprises a respective potential word corresponding to the continuous trace 1022 (e.g., "areal," "squall," and "serrate."). The user can select a word in the suggestion region 1024, which can cause the selected word to replace the most probable word as output by the decoder component 116 shown in the output region 1026 (e.g., "Serrasalmus").

It can further be noted that non-finalized words in the output region 1026 can change responsive to a new word being shown in the output region 1026. In the GUI 1100, the word "The" remains finalized. Comparing the GUI 1000 with the GUI 1100, it can be ascertained that the word "experienced" (GUI 1000) has been changed to "razor-toothed" (GUI 1100) when the word "Serrasalmus" has been added to the output region 1026. The language model 120 can facilitate such updating, as probabilities corresponding to non-finalized words can change when words are added or removed from a word sequence. Thus, if one of the suggested words shown in the suggestion region 1024 is selected by the user, the word "Serrasalmus" can be replaced with the selected word, and one or more of the non-finalized words "razor-toothed" and "piranhas" may also be replaced with other words that are more likely to co-occur with the selected word. Further, if a word is selected by the user, the word can be finalized (and displayed as being finalized in the output region 1026), while non-finalized words can remain visually distinct from finalized words. In still yet another exemplary embodiment, selection of a word in the suggestion region 1024 can cause the most probable word output by the decoder component 116 to be removed from the output region 1026 and displayed in the suggestion region 1024.

Figure 12:
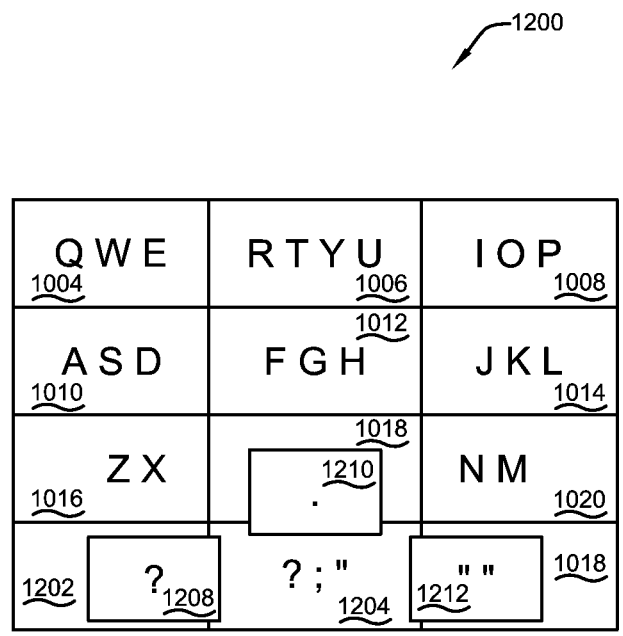
FIGS. 12-13 illustrate exemplary SIPs.

With reference now to FIG. 12, an exemplary SIP 1200 is illustrated. The SIP 1200 comprises the character keys 1004-1020. The SIP 1200 also comprises keys 1202, 1204, and 1206. For example, the key 1202 can be representative of a mode change key, such that when the key 1202 is selected, case of characters in the character keys 1004-1020 is altered (e.g., from uppercase to lowercase or lowercase to uppercase). The key 1204 can be representative of punctuation marks, such as a comma, period, a quotation mark, a question mark, etc. The key 1206 can be representative of a commonly used sequence of characters, such as ".com."

In an exemplary embodiment, at least one of the keys 1202-1206 can be associated with a marking menu. In the example shown in FIG. 12, when the user selects the key 1204 with her thumb, a marking menu is displayed, wherein the marking menu comprises keys 1208-1212. The user can select the key 1204 by tapping the key 1204 (e.g., and holding her thumb on the key), by transitioning her thumb from another key in the SIP 1200 and pausing for some threshold amount of time on the key 1204, etc. In another example, eye gaze tracking can be employed, such that the user gazing at the key 1204 for a particular length of time causes the marking menu to be displayed.

Responsive to the keys 1208-1210 being displayed, the user can select an appropriate key from the keys 1208-1210, thereby causing a selected punctuation mark to be included with text output by the decoder component 116. A selection can be made, for instance, by discretely tapping a key from the keys 1208-1210. In another example, the thumb can be transitioned from the key 1204 to the desirably selected key without removing the thumb from the touch-sensitive display. Thus, if the user wishes to select the key 1208, the user can set forth a stroke from the key 1204 to the key 1208, which can cause a question mark to be displayed with text output by the decoder component 116. In another example, user-selection of the key 1212 can cause quotation marks to surround a word most recently output by the decoder component 116.

Figure 13:
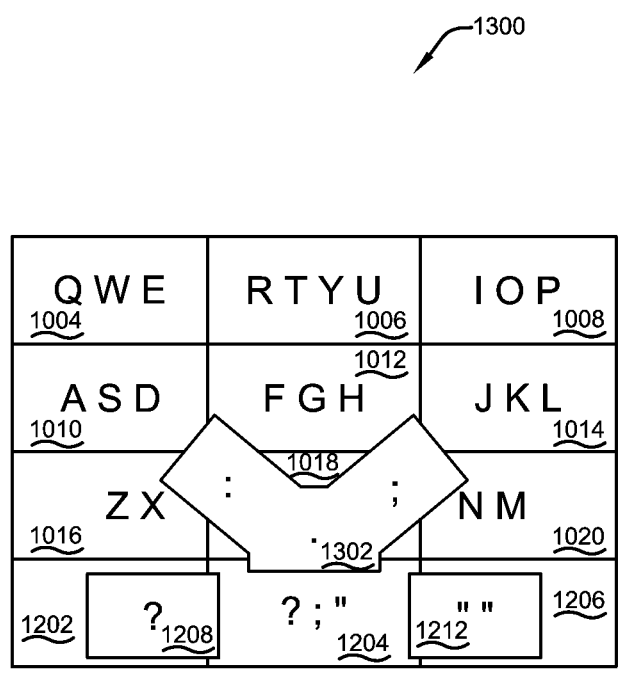

Now referring to FIG. 13, another exemplary SIP 1300 is depicted. The SIP 1300 comprises the character keys 1004-1020 and the keys 1202-1206. In the exemplary SIP 1300, when the user selects the key 1204, a marking menu can be presented, wherein the marking menu comprises the key 1208, and key 1212, and a key 1302. The key 1302 can be representative of three punctuation marks: a colon, a period, and a semicolon. To select an appropriate punctuation mark in the key 1302, the user can slide her thumb over the desirably selected punctuation mark. Through muscle memory, the user can recall that a colon can be selected by initially selecting the key 1204, then moving her thumb upward and to the left.

It is to be understood that other marking menus can also be employed. For instance, a marking menu can be employed to display emoticons. In another example, a marking menu can be employed to allow for a selection of a particular language. In yet another example, a marking menu can be employed to select a particular content (e.g., text message, email message, social network message, . . . ).

Additionally, the SIPs 1000-1300 can have layout that includes arced/slanted keys, similar to the layout shown in FIG. 9.

Figure 14:
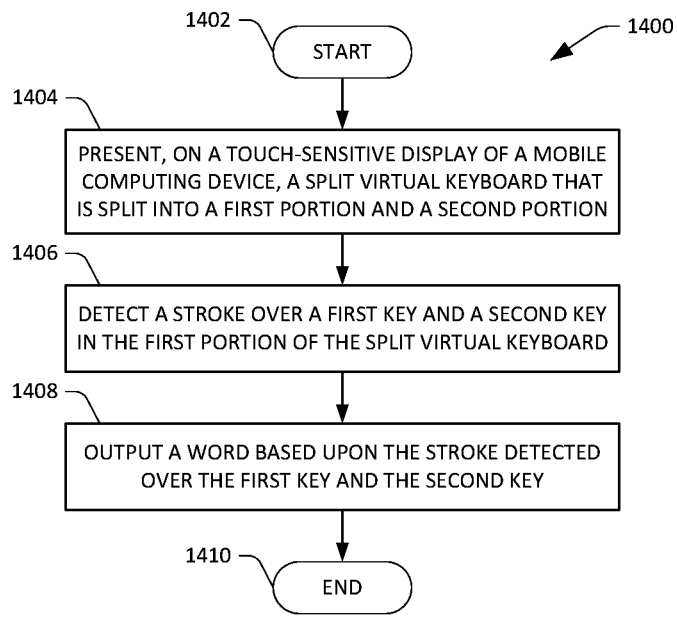
FIG. 14 is a flow diagram that illustrates an exemplary methodology for generating text based upon a sequence of strokes over keys in a first portion of a split virtual keyboard.
Figure 15:
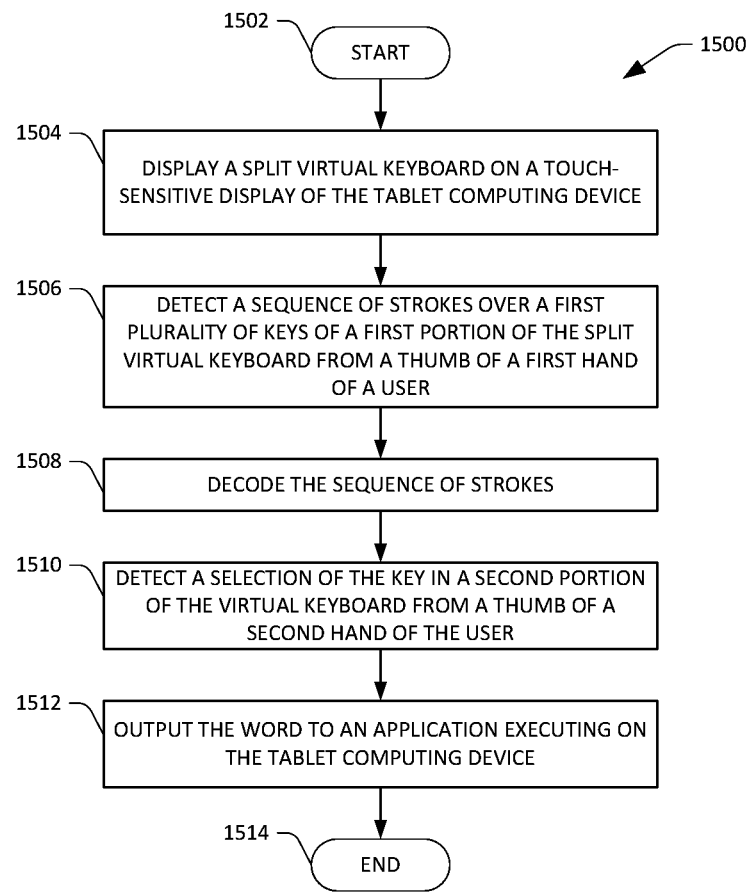
FIG. 15 is a flow diagram that illustrates an exemplary methodology for utilizing a split virtual keyboard on a tablet computing device to generate text.

FIGS. 14-15 illustrate exemplary methodologies relating to use of a split virtual keyboard on a touch-sensitive display of a tablet computing device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 14, an exemplary methodology 1400 that facilitates outputting a word based upon a continuous trace over a portion of a split virtual keyboard is illustrated. The methodology 1100 starts at 1402, and at 1404 a split virtual keyboard is presented on a touch-sensitive display, wherein the split virtual keyboard is split into a first portion and a second portion. For example, the first portion can include a first key and a second key, wherein the first key is representative of a first plurality of characters and the second key is representative of a second plurality of characters. The second portion of the split virtual keyboard comprises at least one key (a third key).

At 1406, a stroke over the first key and the second key is detected, wherein the stroke is a continuous transition over the touch-sensitive display between the first key and the second key. At 1408, responsive to detecting the stroke, a word can be output based upon such stroke over the first key and the second key. As indicated above, position on the touch-sensitive display of the first portion and the second portion can depend upon where the user is detected as gripping the mobile computing device as well as which hand is detected as being the dominant hand of the user. For example, the user can indicate that she is right-handed, which may cause the first portion of the split virtual keyboard to be displayed on a right-hand side of the touch-sensitive display. Alternatively, an indication can be received that the user is left-handed, in which case the first portion of the split virtual keyboard can be displayed on the left-hand side of the touch-sensitive display.

Further, it is to be understood that gestures over the first portion and/or the second portion of the touch-sensitive display can be employed in connection with unlocking the mobile computing device. For instance, at a time that the mobile device is booted or after being idle for a certain amount of time, a lock screen can be presented, thereby requiring receipt of input known only to the user to unlock the locked screen. The user can invoke the split virtual keyboard, for instance, by transitioning one or both thumbs from a bottom edge of the touch-sensitive display radially towards one or both of the side edges of the touch-sensitive display. This can cause the split virtual keyboard to be presented, with the first portion and second portion having a size corresponding to the radial extent of the invocation gesture and at a location corresponding to the invocation gesture. The user may then set forth a sequence of strokes over keys in the first portion of the split virtual keyboard (and optionally a discrete tap or sequence of strokes over keys in the second portion of the split virtual keyboard), which may be utilized to unlock the computing device. Thus, the password can effectively be a sequence of strokes set forth by the user using the split virtual keyboard. The methodology 1400 completes at 1410.

With reference now to FIG. 15, an exemplary methodology 1500 for outputting a word to an application executing on a tablet computing device is illustrated. The methodology 1500 starts at 1502, and at 1504 a split virtual keyboard is displayed on a touch-sensitive display of a tablet computing device. As indicated above, the split virtual keyboard includes a first portion and a second portion, wherein the first portion is displayed at a first location to facilitate receipt of input from a thumb of a first hand of a user who is gripping the tablet computing device. The second portion is displayed at a second location to facilitate receipt of input from a thumb of a second hand of the user who is gripping the tablet computing device. The first portion can include a plurality of keys that are representative of a respective plurality of characters (each character key is representative of a respective plurality of characters). The second portion can include a key that represents an "Enter" key, a "Spacebar" key, a punctuation key, or the like.

At 1506, a sequence of strokes over the first plurality of keys from the thumb of the first hand of the user is detected. At 1508, responsive to detecting a sequence of strokes over keys in the first portion of the split virtual keyboard, a word is identified based upon the sequence of strokes. At 1510, a selection of a key in the second portion of the split virtual keyboard is detected. For instance, it can be ascertained that the "Enter" key in the second portion of the split virtual keyboard has been selected by the thumb of the second hand of the user. At 1012, responsive to the selection of the key in the second portion of the split virtual keyboard being detected, the word that has been identified is output to an application executing on the tablet computing device.

Figure 16:
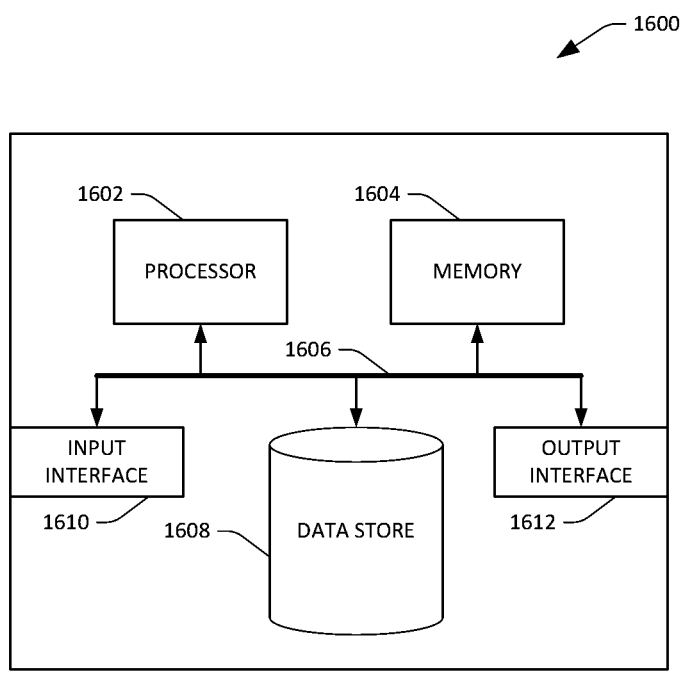
FIG. 16 is an exemplary computing system.

Referring now to FIG. 16, a high-level illustration of an exemplary computing device 1600 that can be used in accordance with the systems and methodologies disclosed herein is illustrated. For instance, the computing device 1600 may be used in a system that supports text generation by way of a continuous sequence of strokes over a portion of a split virtual keyboard. By way of another example, the computing device 1600 can be used in a system that supports display of a split virtual keyboard on a tablet computing device. The computing device 1600 includes at least one processor 1602 that executes instructions that are stored in a memory 1604. The instructions may be, for instance, instructions for implementing functionality described as being carried out by one or more components discussed above or instructions for implementing one or more of the methods described above. The processor 1602 may access the memory 1604 by way of a system bus 1606. In addition to storing executable instructions, the memory 1604 may also store keyboard layouts, imagery, etc.

The computing device 1600 additionally includes a data store 1608 that is accessible by the processor 1602 by way of the system bus 1606. The data store 1608 may include executable instructions, keyboard layouts, etc. The computing device 1600 also includes an input interface 1610 that allows external devices to communicate with the computing device 1600. For instance, the input interface 1610 may be used to receive instructions from an external computer device, from a user, etc. The computing device 1600 also includes an output interface 1612 that interfaces the computing device 1600 with one or more external devices. For example, the computing device 1600 may display text, images, etc. by way of the output interface 1612.

It is contemplated that the external devices that communicate with the computing device 1600 via the input interface 1610 and the output interface 1612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1600 may be a distributed system. Thus, for instance, several devices may be in communication by way of a network connection and may collectively perform tasks described as being performed by the computing device 1600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method performed by a mobile computing device, the method comprising:
   presenting, on a touch-sensitive display of the mobile computing device, a split virtual keyboard that is split into a first portion and a second portion, the first portion comprising a first key and a second key, the first key representative of a first plurality of characters and the second key representative of a second plurality of characters, the second portion comprising a third key, a non-keyboard portion separates the first portion of the split virtual keyboard from the second portion of the split virtual keyboard, and wherein the first portion and the second portion are simultaneously presented on the touch-sensitive display;
   detecting a stroke between the first key and the second key, the stroke being a continuous transition over the touch-sensitive display between the first key and the second key; and
   responsive to detecting the stroke, outputting a word based upon the stroke detected over the first key and the second key.

2. The method of claim 1, further comprising:
   receiving input that indicates a desire to set forth handwritten scripts;
   responsive to receiving the input, receiving a stroke that is representative of a handwritten character; and
   decoding the stroke to identify the handwritten character.

3. The method of claim 1, further comprising:
   detecting input on the third key; and
   responsive to detecting the input on the third key, altering a format of the word.

4. The method of claim 1, wherein the third key represents one of a number or an emoticon, and further comprising:
   detecting input on the third key; and
   responsive to detecting the input on the third key, outputting the one of the number or the emoticon.

5. The method of claim 1, wherein presenting the split virtual keyboard on the display screen comprises:
   presenting the first portion at a first position on the touch-sensitive display to facilitate receipt of input from a thumb of a first hand of a user; and
   presenting the second portion at a second position on the touch-sensitive display to facilitate receipt of input from a thumb of a second hand of the user.

6. The method of claim 1, further comprising:
   detecting a gesture over the touch-sensitive display; and
   changing a position of at least one of the first portion of the split virtual keyboard or the second portion of the split virtual keyboard based at least in part upon the gesture detected over the touch-sensitive display.

7. The method of claim 1, further comprising:
   detecting an invocation gesture over the touch-sensitive display; and
   responsive to detecting the invocation gesture, presenting at least one of the first portion or the second portion on the touch-sensitive display, the at least one of the first portion or the second portion having a size that is based upon the invocation gesture.

8. The method of claim 1, further comprising:
   receiving an indication of which of a left hand or a right hand is a dominant hand of a user of the mobile computing device; and
   presenting the first portion and the second portion of the split keyboard on the touch-sensitive display based at least in part upon the indication.

9. The method of claim 1, further comprising:
   detecting a location where a hand of a user of the mobile computing device is gripping the mobile computing device; and
   responsive to detecting the location, presenting at least one of the first portion or the second portion of the split virtual keyboard on the touch-sensitive display at a respective location based upon the location where the hand of the user is detected to be gripping the mobile computing device.

10. The method of claim 1, further comprising:
    presenting a locked screen on the touch-sensitive display;
    detecting an invocation gesture;
    responsive to detecting the invocation gesture, presenting the split virtual keyboard on the touch-sensitive display;
    detecting a sequence of strokes over several keys in at least one of the first portion or the second portion of the split virtual keyboard; and
    unlocking the mobile computing device responsive to detecting the sequence of strokes over the several keys in the at least one of the first portion or the second portion of the split virtual keyboard.

11. The method of claim 1, further comprising:
    configuring keys in at least one of the first portion or the second portion of the split keyboard based upon an application being executed by the mobile computing device.

12. A mobile computing device, comprising:
    a touch-sensitive display;
    at least one processing apparatus; and
    memory that comprises instructions that, when executed by the processing apparatus, cause the processing apparatus to perform a plurality of acts comprising:
       displaying a split virtual keyboard on the touch-sensitive display, the split virtual keyboard comprising a first portion displayed at a first position on the touch-sensitive display to facilitate receipt of input thereover from a digit on a first hand, the split virtual keyboard further comprising a second portion displayed at a second position on the touch-sensitive display to facilitate receipt of input thereover from a digit on a second hand, the first portion concurrently displayed with the second portion, the first portion comprising a plurality of keys, the first portion and the second portion of the split virtual keyboard are separated by a non-keyboard portion;
       detecting a sequence of strokes over keys in the plurality of keys of the first portion of the split virtual keyboard, wherein a stroke is a continuous transition of the digit on the first hand over the touch-sensitive input panel between respective keys, and wherein the digit on the first hand maintains contact with the touch-sensitive display during the sequence of strokes; and decoding a word based at least in part upon the detected sequence of strokes.

13. The mobile computing device of claim 12, the plurality of acts further comprising:

detecting an input gesture on the touch-sensitive display;

responsive to detecting the input gesture, displaying a selectable application, file, or menu option on the touch-sensitive display, wherein the word is employed in connection with searching for or selecting the selectable application, file, or menu option.

14. The mobile computing device of claim 12, wherein each key in the plurality of keys in the first portion of the split virtual keyboard represents a respective plurality of characters.

15. The mobile computing device of claim 12, the plurality of acts further comprising:

detecting input over the second portion; and responsive to detecting the input over the second portion, updating the first portion of the split keyboard.

16. The mobile computing device of claim 15, wherein updating the first portion of the split virtual keyboard comprises altering a case of characters represented by the plurality of keys from lowercase characters to uppercase characters.

17. The mobile computing device of claim 15, wherein updating the first portion of the split virtual keyboard comprises altering a language of characters represented by the plurality of keys from a first language to a second language.

18. The mobile computing device of claim 12, wherein each key in the plurality of keys represents a respective plurality of characters, and wherein the second portion of the split virtual keyboard comprises a second plurality of keys that represent respective numbers.

19. The mobile computing device of claim 12, wherein each key in the plurality of keys represents a respective plurality of characters, and wherein the second portion of the split virtual keyboard comprises a second plurality of keys that represent respective punctuation marks.

20. A tablet computing device comprising instructions that, when executed by a processing unit of the tablet computing device, causes the tablet computing device to perform acts comprising:

displaying a split virtual keyboard on a touch-sensitive display of the tablet computing device, the split virtual keyboard comprising a first portion and a second portion, the first portion displayed at a first location to facilitate receipt of input from a thumb of a first hand of a user gripping the tablet computing device, the second portion displayed at a second location to facilitate receipt of input from a thumb of a second hand of the user gripping the tablet computing device, the first portion comprising a first plurality of keys, each key in the first plurality of keys representing a respective plurality of characters, the second portion comprising a key that represents an "Enter" key;

detecting a sequence of strokes over the first plurality of keys from the thumb of the first hand of the user, a stroke being a continuous transition of the thumb of the first hand over the touch-sensitive display while maintaining contact with the touch-sensitive display;

responsive to detecting the sequence of strokes over the first plurality of keys, decoding the sequence of strokes to identify a word;

detecting a selection of the key in the second portion of the split virtual keyboard; and responsive to the selection of the key being detected, outputting the word to an application executing on the tablet computing device.

* * * * *